(12) United States Patent
Wiederin et al.

(10) Patent No.: US 11,499,895 B2
(45) Date of Patent: Nov. 15, 2022

(54) SYSTEM FOR COLLECTING LIQUID SAMPLES AND TRANSPORTING OVER DISTANCES WHILE MAINTAINING A LIQUID SAMPLE SEGMENT

(71) Applicant: Elemental Scientific, Inc., Omaha, NE (US)

(72) Inventors: Daniel R. Wiederin, Omaha, NE (US); Kyle W. Uhlmeyer, Omaha, NE (US); Austin Schultz, Omaha, NE (US); Jacob Unnerstall, Omaha, NE (US); Kevin Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 79 days.

(21) Appl. No.: 17/046,567

(22) PCT Filed: Apr. 9, 2019

(86) PCT No.: PCT/US2019/026579
§ 371 (c)(1),
(2) Date: Oct. 9, 2020

(87) PCT Pub. No.: WO2019/199825
PCT Pub. Date: Oct. 17, 2019

(65) Prior Publication Data
US 2021/0131918 A1 May 6, 2021

Related U.S. Application Data

(60) Provisional application No. 62/693,555, filed on Jul. 3, 2018, provisional application No. 62/655,498, filed on Apr. 10, 2018.

(51) Int. Cl.
*G01N 1/14* (2006.01)
*H01J 49/40* (2006.01)

(52) U.S. Cl.
CPC ............... *G01N 1/14* (2013.01); *H01J 49/40* (2013.01); *G01N 2001/1445* (2013.01)

(58) Field of Classification Search
CPC .... G01N 1/14; G01N 2001/145; G01N 30/24; G01N 2030/027; H01J 49/40
(Continued)

(56) References Cited

U.S. PATENT DOCUMENTS

| 6,505,524 B1 | 1/2003 | Silvis |
| 9,620,343 B1 | 4/2017 | Field |

(Continued)

FOREIGN PATENT DOCUMENTS

| EP | 0522828 | * 1/1993 |
| EP | 2937687 A1 | 10/2015 |

OTHER PUBLICATIONS

PCT International Search Report and Written Opinion for PCT/US2019/026579, dated Aug. 2, 2019.

*Primary Examiner* — Robert R Raevis
(74) *Attorney, Agent, or Firm* — Kevin E. West; Advent, LLP

(57) ABSTRACT

Systems and methods are described to maintain a liquid sample segment of a sample transmitted through a transfer line from a remote sampling to an analysis system. A system, embodiment includes, but is not limited to, a sample transfer line configured to transport a liquid sample from a remote sampling system via gas pressure; a sample loop fluidically coupled with the sample transfer line, the sample loop configured to hold a sample fluid; and a backpressure chamber fluidically coupled with a gas pressure source and with the sample transfer line, the backpressure chamber configured to supply a backpressure against the liquid sample during transport through the sample transfer line.

20 Claims, 19 Drawing Sheets

(58) Field of Classification Search
USPC .......... 73/61.41, 61.55, 61.56, 61.59, 64.56,
73/863.72, 863.73, 864.21, 864.22,
73/864.83; 422/70, 81, 82
See application file for complete search history.

(56) References Cited

U.S. PATENT DOCUMENTS

2003/0170903 A1   9/2003   Johnson et al.
2016/0305917 A1   10/2016  Diaz et al.

* cited by examiner

SYSTEM FOR COLLECTING LIQUID SAMPLES AND TRANSPORTING OVER DISTANCES WHILE MAINTAINING A LIQUID SAMPLE SEGMENT

CROSS-REFERENCE TO RELATED APPLICATIONS

The present application claims the benefit of 35 U.S.C. § 119(e) of U.S. Provisional Application Ser. No. 62/655,498 filed Apr. 10, 2018 and titled "SYSTEM FOR COLLECTING LIQUID SAMPLES AND TRANSPORTING OVER DISTANCES WHILE MAINTAINING A LIQUID SAMPLE SEGMENT," and U.S. Provisional Application Ser. No. 62/693,555 filed Jul. 3, 2018 and titled "SYSTEM FOR COLLECTING LIQUID SAMPLES AND TRANSPORTING OVER DISTANCES WHILE MAINTAINING A LIQUID SAMPLE SEGMENT." U.S. Provisional Application Ser. No. 62/655,498 and U.S. Provisional Application Ser. No. 62/693,555 are herein incorporated by reference in their entireties.

BACKGROUND

In many laboratory settings, it is often necessary to analyze a large number of chemical or biological samples at one time. In order to streamline such processes, the manipulation of samples may be mechanized. Such mechanized sampling can be referred to as auto sampling and can be performed using an automated sampling device, or autosampler.

Spectrometry refers to the measurement of radiation intensity as a function of wavelength to identify component parts of materials. Inductively Coupled Plasma (ICP) spectrometry is an analysis technique commonly used for the determination of trace element concentrations and isotope ratios in liquid samples. For example, in the semiconductor industry, ICP spectrometry can be used to determine metal concentrations in samples. ICP spectrometry employs electromagnetically generated partially ionized argon plasma that reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample. The sample to be analyzed is often provided in a sample mixture.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like), or other sample detector or analytic instrumentation for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

DRAWINGS

The Detailed Description is described with reference to the accompanying figures. Any dimensions included in the accompanying figures are provided by way of example only and are not meant to limit the present disclosure.

DETAILED DESCRIPTION

Overview

Figure 1:
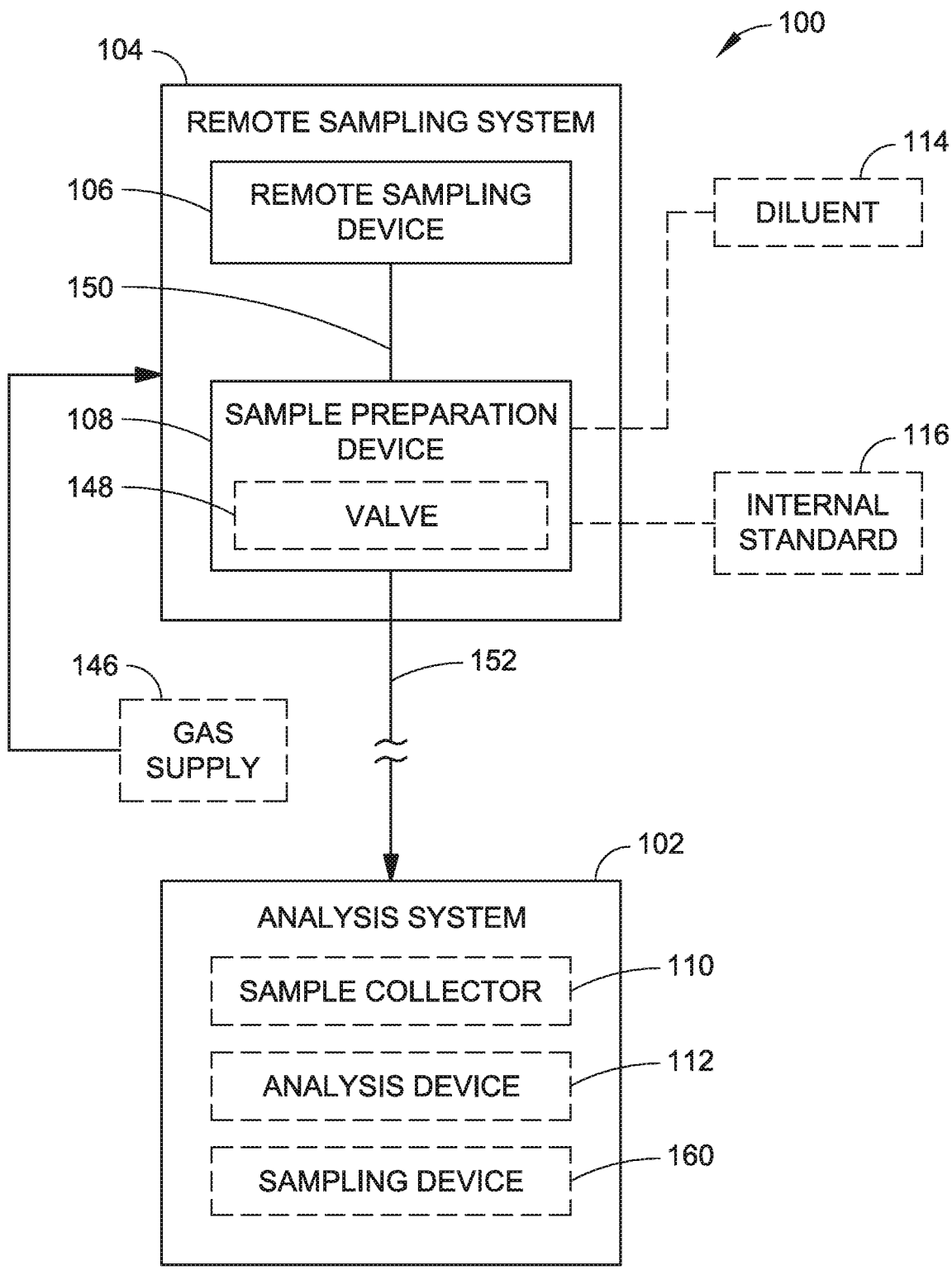
FIG. 1 is a partial line diagram illustrating a system configured to analyze samples transported over long distances in accordance with example embodiments of the present disclosure.

Referring generally to FIGS. 1 through 13, systems and methods for supplying substantially continuous liquid samples from a remote sampling system over a long distance to an analysis system are described. Determination of trace elemental concentrations or amounts in a sample can provide an indication of purity of the sample, or an acceptability of the sample for use as a reagent, reactive component, or the like. For instance, in certain production or manufacturing processes (e.g., mining, metallurgy, semiconductor fabrication, pharmaceutical processing, etc.), the tolerances for impurities or the presence of certain chemicals can be very strict, for example, on the order of fractions of parts per billion. As such, ensuring enough sample is present at a sample analysis system can facilitate accurate determinations of the trace elemental concentrations or amounts in samples. For samples received from a remote location, such as through a transfer line between a remote sampling system and an analysis system, transit through the line can cause degassing or separation of the sample which can form gas pockets within the transfer line, discontinuous liquid sample segments within the transfer line, or the like, which can result in unsuitable liquid sample segments for analysis by the analysis system. For example, the gas pockets or discontinuous liquid sample segments can allow gas to be introduced to the analysis system in combination with the sample, which can lead to inaccurate concentration determinations by the analysis system. Further, some samples are susceptible to degassing or separating within a fluid transfer line. For example, samples with high vapor pressures or low surface tensions, including but not limited to ammonium hydroxide, isopropyl alcohol, organic samples, surfactants, or combinations thereof, can separate or degas when pushed through a transfer line via gas pressure.

Accordingly, the present disclosure is directed, at least in part, to systems and methods for supplying substantially continuous liquid samples from a remote sampling system over a long distance to an analysis system. Example systems employ a back pressure chamber to introduce a back pressure to a transfer line through which a sample is transmitted from a remote sampling system via gas pressure that exceeds the back pressure. The remote sampling system can include a gas flow control device that may control a constant pressure of a gas supplied to move the sample through the transfer line. In other example embodiments, the gas flow control device may control a constant flow rate of the gas. For certain samples, a constant gas flow rate may be necessary to move the sample, such as a liquid sample, at a constant flow rate. For certain other samples, constant gas pressure may be necessary to move the sample at a constant flow rate. In other example embodiments, a combination of backpressure and flow rate control may be employed. Example systems can transfer samples with high vapor pressures or low surface tensions, including but not limited to ammonium hydroxide, isopropyl alcohol, organic samples, surfactants, or combinations thereof through transfer lines to an analysis system while maintaining a substantially continuous liquid sample segment within the transfer line without unintended degassing or other inadvertent introduction of gas pockets in the sample segment. Systems and methods as described herein can be used for various applications, including, but not necessarily limited to: pharmaceutical applications (e.g., with a central mass spectrometer analysis device connected to multiple pharmaceutical reactors), waste monitoring of one or more waste streams, semiconductor fabrication facilities, and so forth. For example, a waste stream may be continuously monitored for contaminants and diverted to a tank when a contaminant is detected.

A system embodiment of the disclosure includes, but is not limited to, a sample transfer line configured to transport a liquid sample from a remote sampling system via gas pressure; a sample loop fluidically coupled with the sample transfer line and the buffer fluid loop, the sample loop configured to hold a sample fluid; and a backpressure chamber fluidically coupled with a gas pressure source and with the sample transfer line, the backpressure chamber configured to supply a backpressure against the liquid sample during transport through the sample transfer line.

According to another embodiment of the disclosure, a method of maintain a liquid sample segment may be provided. The method may include receiving a liquid sample at a remote sampling system, preparing the liquid sample for delivery and/or analysis using one or more preparation techniques, and transferring the liquid sample via a sample transfer line. Transferring the liquid sample via the sample transfer line may further include creating a sample loop fluidically coupled to the sample transfer line and configured to hold a volume of liquid sample, using a gas pressure of a gas pressure source to push the buffer fluid from the buffer loop and the volume of liquid sample from the sample loop, and supplying a backpressure against the liquid sample during transport through the sample transfer line, the backpressure generated by a backpressure chamber fluidically coupled with the gas pressure source and with the sample transfer line.

According to another embodiment of the disclosure, a system embodiment includes, but is not limited to, a sample transfer line configured to transport a liquid sample from a remote sampling system, a controller in communication with the remote sampling system, and a memory comprising computer-executable instructions. The memory comprising computer-executable instructions may be capable of receiving the liquid sample at the remote sampling system, preparing the liquid sample for delivery and/or analysis using one or more preparation techniques, and transferring the liquid sample via a sample transfer line. Transferring the liquid sample via the sample transfer line may further include creating a sample loop fluidically coupled to the sample transfer line and configured to hold a volume of liquid sample, using a gas pressure of a gas pressure source to push the buffer fluid from the buffer loop and the volume of liquid sample from the sample loop, and supplying a backpressure against the liquid sample during transport through the sample transfer line, the backpressure generated by a backpressure chamber fluidically coupled with the gas pressure source and with the sample transfer line.

Example Implementations

Referring now to FIG. 1, a system 100 may be configured to analyze samples transported over long distances. In example embodiments, one or more samples can be analyzed by multiple analysis systems, where such analysis systems can comprise differing analysis techniques. The system 100 may include an analysis system 102 at a first location. The system 100 can also include one or more remote sampling systems 104 at a second location remote from the first location. For instance, the one or more remote sampling systems 104 can be positioned proximate a source of chemical, such as a chemical storage tank, a chemical treatment tank (e.g., a chemical bath), a chemical transport line or pipe, or the like (e.g., the second location), to be analyzed by the analysis system 102, where the analysis system 102 can be positioned remote from the remote sampling system(s) 104, such as an analysis hub for a production facility (e.g., the first location). The system 100 can also include one or more remote sampling system(s) 104 at a third location, a fourth location, and so forth, where the third location and/or the fourth location are remote from the first location. In implementations, the third location, the fourth location, and other locations of the remote sampling systems 104 can be remote from respective other locations of other remote sampling systems 104. For example, one remote sampling system 104 can be positioned at a water line (e.g., a deionized water transport line), whereas one or more other remote sampling systems 104 can be positioned at a chemical storage tank, a chemical treatment tank (e.g., a chemical bath), a chemical transport line or pipe, or the like. In some embodiments, the system 100 also may include one or more remote sampling system(s) 104 at the first location (e.g., proximate to the analysis system 102). For example, a sampling system 104 at the first location may include an autosampler coupled with the analysis system 102. The one or more sampling systems 104 can be operable to receive samples from the first location, the second location, the third location, the fourth location, and so forth, and the system 100 can be operable to deliver the samples to the analysis system 102 for analysis.

The remote sampling system 104 can be configured to receive a sample 150 and prepare the sample 150 for delivery (e.g., to the analysis system 102) and/or analysis. In embodiments, the remote sampling system 104 can be disposed various distances from the analysis system 102 (e.g., 1 m, 5 m, 10 m, 30 m, 50 m, 100 m, 300 m, 1000 m, etc.). In implementations, the remote sampling system 104 can include a remote sampling device 106 and a sample preparation device 108. The sample preparation device 108 may further include a valve 148, such as a flow-through valve. In implementations, the remote sampling device 106 can include a device configured for collecting a sample 150 from a sample stream or source (e.g., a liquid, such as waste water, rinse water, chemical, industrial chemical, etc., a gas, such as an air sample and/or contaminants therein to be contacted with a liquid, or the like). The remote sampling device 106 can include components, such as pumps, valves, tubing, sensors, etc., suitable for acquiring the sample from the sample source and delivering the sample to the analysis system 102. The sample preparation device 108 can include a device configured to prepare a collected sample 150 from the remote sampling device 106 using a diluent 114, an internal standard 116, a carrier 154, etc., such as to provide particular sample concentrations, spiked samples, calibration curves, or the like, and can be rinsed with a rinse solution (shown in reference to FIG. 3B).

In some embodiments, the sample 150 may be prepared (e.g., prepared sample 152) for delivery and/or analysis using one or more preparation techniques, including, but not necessarily limited to: dilution, pre-concentration, addition of one or more calibration standards, and so forth. For example, a viscous sample 150 can be remotely diluted (e.g., by sample preparation device 108) before being delivered to the analysis system 102 (e.g., to prevent the sample 150 from separating during delivery). As described herein, a sample that has been transferred from the remote sampling system 104 can be referred to simply as a sample 150. Additionally, sample 150 can also refer to a prepared sample 152. In some embodiments, sample dilution may be dynamically adjusted (e.g., automatically adjusted) to move sample(s) 150 through system 100 at a desired rate. For instance, diluent 114 added to a particular sample or type of sample is increased when a sample 150 moves through the system 100 too slowly (e.g., as measured by the transfer time from the second location to the first location). In another example, one liter (1 L) of seawater can be remotely pre-concentrated before delivery to the analysis system 102. In a further example, electrostatic concentration is used on material from an air sample to pre-concentrate possible airborne contaminants. In some embodiments, in-line dilution and/or calibration is automatically performed by the system 100. For instance, a sample preparation device 108 can add one or more internal standards to a sample delivered to the analysis system 102 to calibrate the analysis system 102.

In embodiments of the disclosure, the analysis system 102 can include a sample collector 110 configured to collect the sample 150. The sample collector 110 can include components, such as pumps, valves, tubing, ports, sensors, etc., to receive the sample 150 from one or more of the remote sampling systems 104. Additionally, the analysis system 102 may include a sampling device 160 configured to collect the sample 150 that is local to the analysis system 102 (e.g., a local autosampler).

The analysis system 102 may further include at least one analysis device 112 configured to analyze samples to determine trace element concentrations, isotope ratios, and so forth (e.g., in liquid samples). For example, the analysis device 112 can include ICP spectrometry instrumentation including, but not limited to, an Inductively Coupled Plasma Mass Spectrometer (ICP/ICP-MS) (e.g., for trace metal determinations), an Inductively Coupled Plasma Atomic Emission Spectrometer (ICP-AES), ICPOES (e.g., for trace metal determinations), ion chromatograph (e.g., for anion and cation determinations), liquid chromatograph (LC) (e.g., for organic contaminants determinations), FTIR infrared (e.g., for chemical composition and structural information determinations), particle counter (e.g., for detection of undissolved particles), moisture analyzer (e.g., for detection of water in samples), gas chromatograph (GC) (e.g., for detection of volatile components), or the like. In embodiments, the analysis system 102 may include a plurality of analysis devices 112 (i.e., more than one analysis device). The system 100 and/or the analysis system 102 can further include multiple sampling loops, with each sampling loop introducing a portion of the sample to the plurality of analysis devices 112. In an example embodiment, the system 100 and/or the analysis system 102 can be configured with a multiposition valve, such that a single sample can be rapidly and serially introduced to the plurality of analysis devices 112. In embodiments, the plurality of analysis devices 112 can be located at the same location as the remote sampling device 104, while the system 100 can include one or more additional analysis devices 112 located remotely from the remote sampling system 104 for additional or differing sample analysis than those analys(es) performed by the plurality of analysis devices 112. Alternatively, or additionally, the plurality of analysis devices 112 can be located at a different location than the remote sampling system 104.

The system 100 and/or analysis system 102 can be configured to report analyte concentration at a location over time (shown further below with reference to FIG. 13). In some embodiments, the analysis device 112 may be configured to detect one or more trace metals in the sample 150. In other embodiments, the analysis device 112 may be configured for ion chromatography. For example, ions and/or cations can be collected in the sample 150 and delivered to a chromatograph analysis device 112. As another example, one or more chemical streams can be continuously monitored via analysis of the samples obtained by one or more of the remote sampling systems 104 linked to the analysis system 102, whereby a contamination limit can be set for each of the chemical streams. Upon detection of a contaminant exceeding the contamination limit for a particular stream, the system 100 can provide an alert.

The reproducibility of the system 100 may be tested through an example implementation. In an implementation, the analysis system 102 may be positioned one hundred meters (100 m) from a remote sampling system 104. The remote sampling system 104 may obtain twenty discrete samples and transport them to the analysis system 102 for determination of the signal intensity of each chemical specie present in each of the twenty discrete samples. Each discrete sample may include the following chemical species: Lithium (Li), Beryllium (Be), Boron (B), Sodium (Na), Magnesium (Mg), Aluminum (Al), Calcium (Ca), Manganese (Mn), Iron (Fe), Cobalt (Co), Nickel (Ni), Copper (Cu), Zinc (Zn), Germanium (Ge), Strontium (Sr), Silver (Ag), Cadmium (Cd), Indium (In), Tin (Sn), Antimony (Sb), Barium (Ba), Cerium (Ce), Hafnium (Hf), Tungsten (W), and Lead (Pb). Upon analysis by the analysis system 102, the relative standard deviation (RSD) across all twenty discrete samples for all chemical species may be determined. An example RSD may be less than three percent (3%). Accordingly, the example system 100 at one hundred meters between the analysis system 102 and the remote sampling system 104 may be found to have reliable reproducibility from obtaining the sample, transferring the sample one hundred meters to the analysis system 102, and analyzing the samples with the analysis system 102.

Figure 2A:
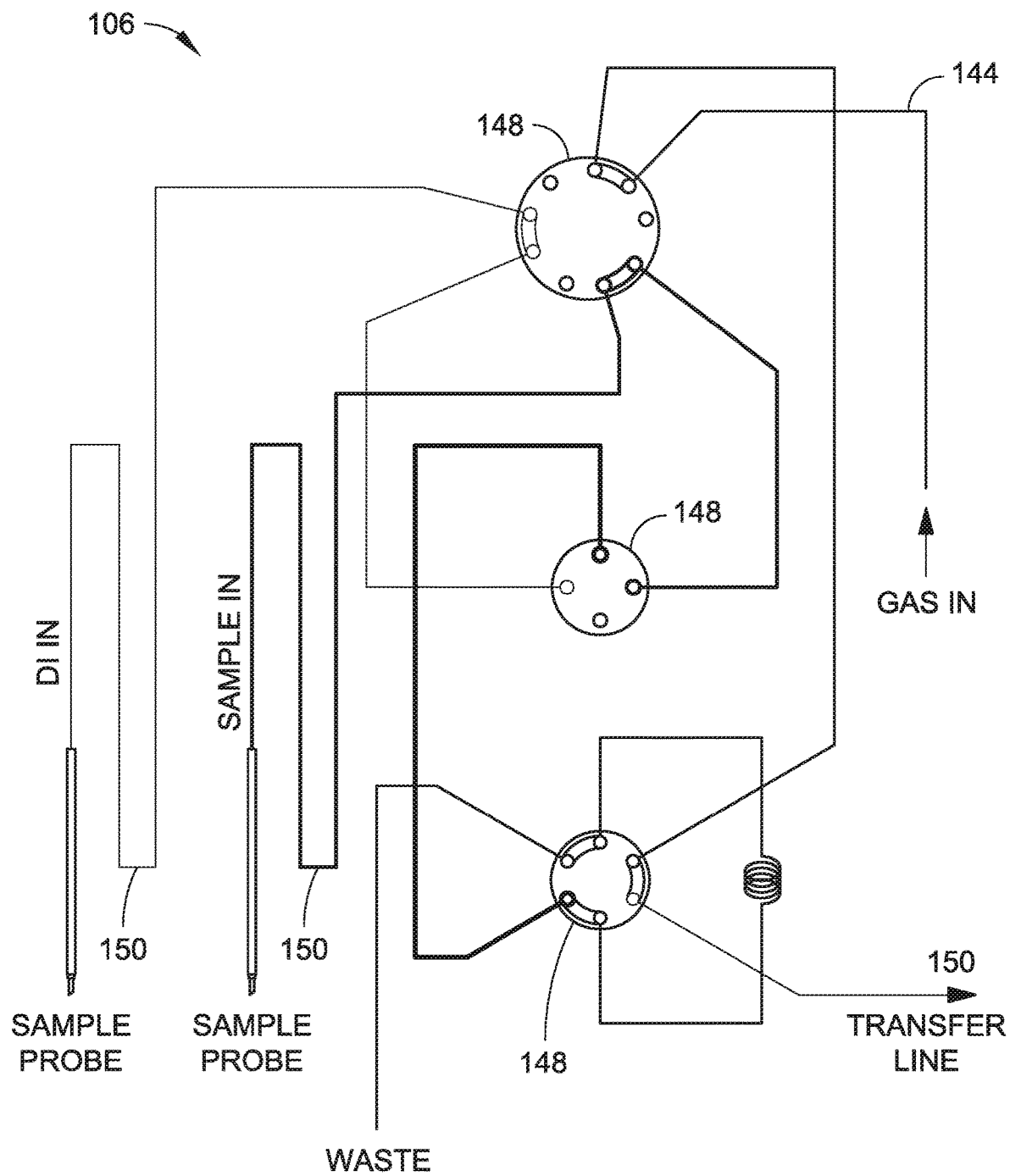
FIG. 2A is an environmental view illustrating a remote sampling device used in a remote sampling system, in accordance with example embodiments of the present disclosure.
Figure 2B:
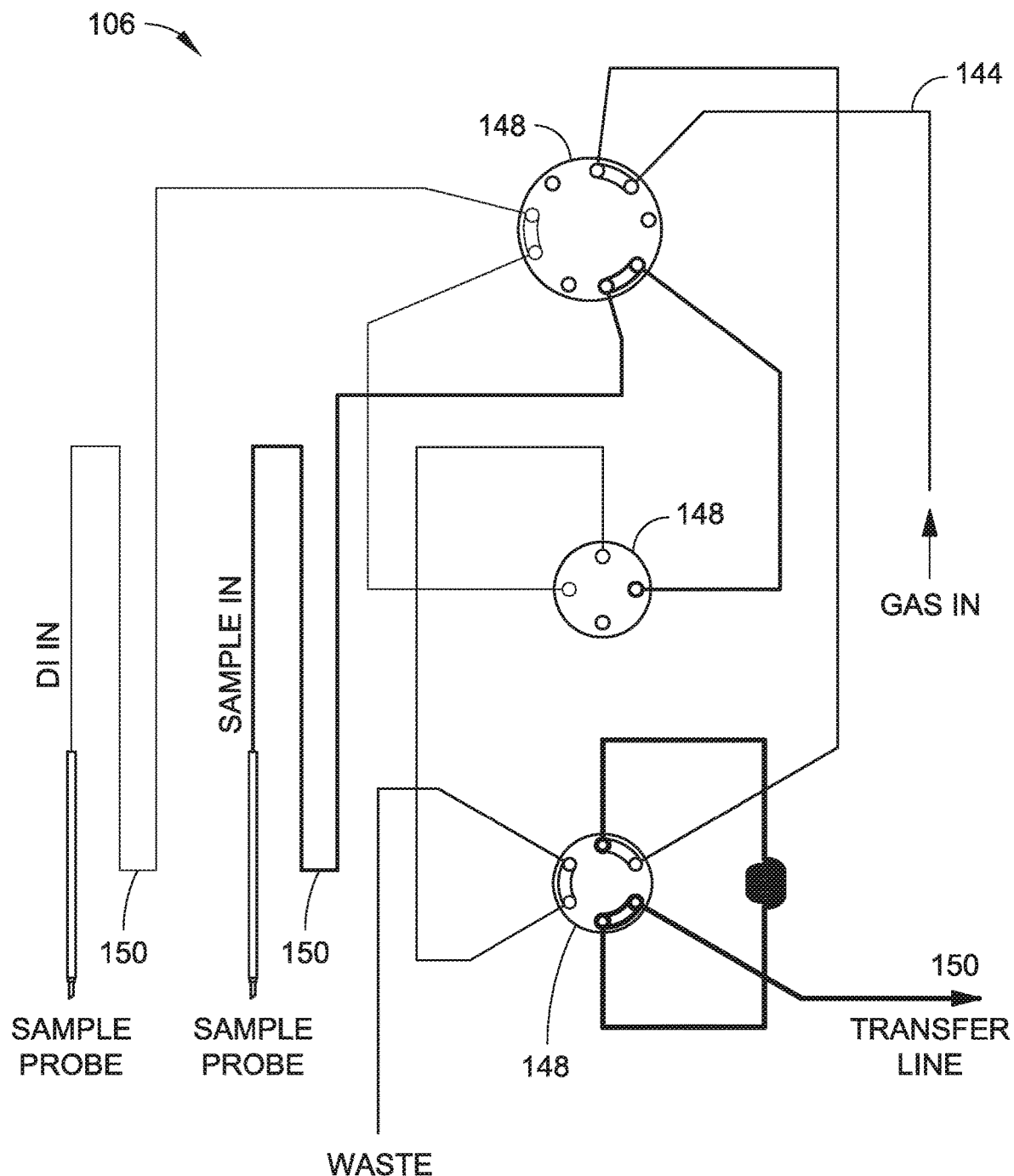
FIG. 2B is an environmental view illustrating a remote sampling device used in a remote sampling system, in accordance with example embodiments of the present disclosure.

Referring now to FIGS. 2A and 2B, the remote sampling system 104 or the remote sampling device 106 can be configured to selectively couple with at least one sample transfer line 144 so that the remote sampling system 104 is operable to be in fluid communication with the sample transfer line 144 for supplying a continuous liquid sample segment 150 to the sample transfer line 144. For example, the remote sampling system 104 may be configured to collect a sample 150 and supply the sample 150 to the sample transfer line 144 using, for instance, a flow-through valve 148, coupling the remote sampling system 104 to the sample transfer line 144. The supply of the sample 150 to the sample transfer line 144 can be referred to as a "pitch." The sample transfer line 144 can be coupled with a gas supply 146 (as shown in FIG. 1) and can be configured to transport gas from the second location (and possibly the third location, the fourth location, and so forth) to the first location. FIGS. 2A and 2B depict example load and inject configuration for the multiposition valve 148. Sample 150 may initially be pushed into a loop, and then pushed by the gas from the sample transfer line 144 in the inject mode. In this manner, liquid sample segments supplied by the remote sampling system 104 may be collected in a gas stream, and may be transported to the location of the analysis system 102 using gas pressure sample transfer.

In some embodiments, gas in the sample transfer line 144 can include an inert gas, including, but not necessarily limited to: nitrogen gas, argon gas, and so forth. In some embodiments, the sample transfer line 144 may include an unsegmented or minimally segmented tube having an inside diameter of eight-tenths of a millimeter (0.8 mm). However, an inside diameter of eight-tenths of a millimeter is provided by way of example only and is not meant to limit the present disclosure. In other embodiments, the sample transfer line 144 may include an inside diameter greater than eight-tenths of a millimeter and/or an inside diameter less than eight-tenths of a millimeter. In some embodiments, pressure in the sample transfer line 144 can range from at least approximately four (4) bar to ten (10) bar. However, this range is provided by way of example only and is not meant to limit the present disclosure. In other embodiments, pressure in the sample transfer line 144 may be greater than ten bar and/or less than four bar. Further, in certain embodiments, the pressure in the sample transfer line 144 may be adjusted so that samples 150 are dispensed in a generally upward direction (e.g., vertically). Such vertical orientation can facilitate transfer of a sample collected at a location that is lower than the analysis system 102 (e.g., where sample source(s) and remote sampling system(s) are located "downstairs" relative to the analysis system 102).

In some examples, the sample transfer line 144 can be coupled with a remote sampling system 104 in fluid communication with a first liquid bath (or chemical bath) and an analysis system 102 in fluid communication with a second liquid bath (or chemical bath). In embodiments of the disclosure, the system 100 may include one or more leak sensors (e.g., mounted in a trough) to prevent or minimize overflow at the first location and/or one or more remote locations (e.g., the second location, the third location, the fourth location, and so forth). A pump, such as a syringe pump or a vacuum pump, may be used to load sample into the sampling device 106. A valve 148 may be used to select the sample 150 at the remote sampling system 104, and the sample 150 can be supplied to the sample transfer line 144, which can deliver the sample 150 to the analysis system 102 at the first location. Another pump, such as a diaphragm pump, may be used to pump a drain on the analysis system 102 and pull the sample 150 from the sample transfer line 144.

The system 100 can be implemented as an enclosed sampling system, where the gas and samples in the sample transfer line 144 may not be exposed to the surrounding environment. For example, a housing and/or a sheath can enclose one or more components of the system 100. In some embodiments, one or more sample lines of the remote sampling system 104 may be cleaned between sample deliveries. Furthermore, the sample transfer line 144 may be cleaned (e.g., using a cleaning solution) between samples 150.

Figure 3A:
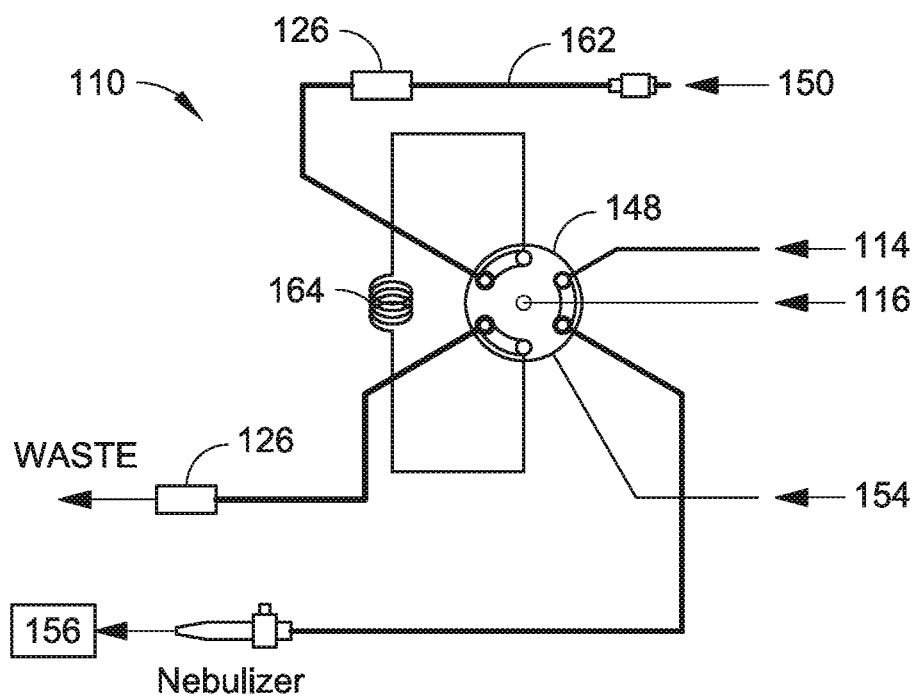
FIG. 3A is an environmental view illustrating an analysis device used in an analysis system, in accordance with example embodiments of the present disclosure.
Figure 3B:
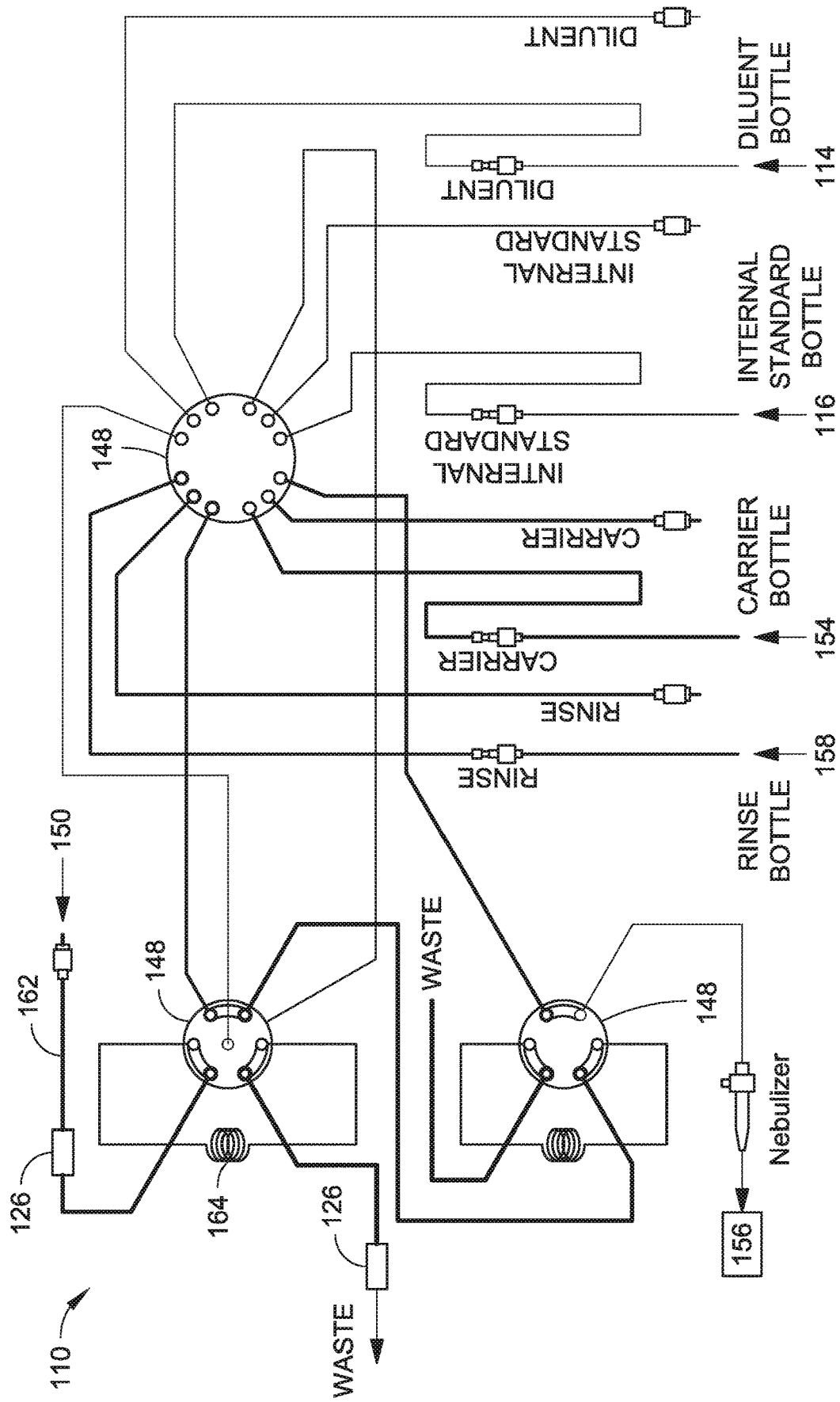
FIG. 3B is an environmental view illustrating an analysis device used in an analysis system, in accordance with example embodiments of the present disclosure.

Referring now to FIGS. 3A and 3B, example configurations for the sample collection system 110 are depicted. As indicated, the sample transfer line 144 can be configured to selectively couple with a sample receiving line 162 (e.g., a sample loop 164) at the first location so that the sample loop 164 is operable to be in fluid communication with the sample transfer line 144 to receive a continuous liquid sample segment. The delivery of the continuous liquid sample segment to the sample loop 164 can be referred to as a "catch." The sample loop 164 is also configured to selectively couple with the analysis device 112 so that the sample loop 164 may be in fluid communication with the analysis device 112 to supply the continuous liquid sample segment to the analysis device 112 (e.g., when the system 100 determines that a sufficient liquid sample segment is available for analysis by the analysis system 102). In embodiments, a valve, such as a multi-port valve 148 switchable between at least two flow path configurations (e.g., a first flow path configuration of valve 148 shown in FIG. 3A; a second flow path configuration of valve 148 shown in FIG. 3B, etc.) may be positioned between the sample 150 and the sample loop 164. In embodiments, a nebulizer 156 may be used in conjunction with an example analysis device 112, such as high resolution time-of-flight (HR-ToF) mass spectrometer analysis device to analyze organic molecules, proteins, and so on in samples. As indicated in FIG. 3B, more than one multi-port valve 148 may be provided in conjunction with the sample collection system 110.

Figure 4:
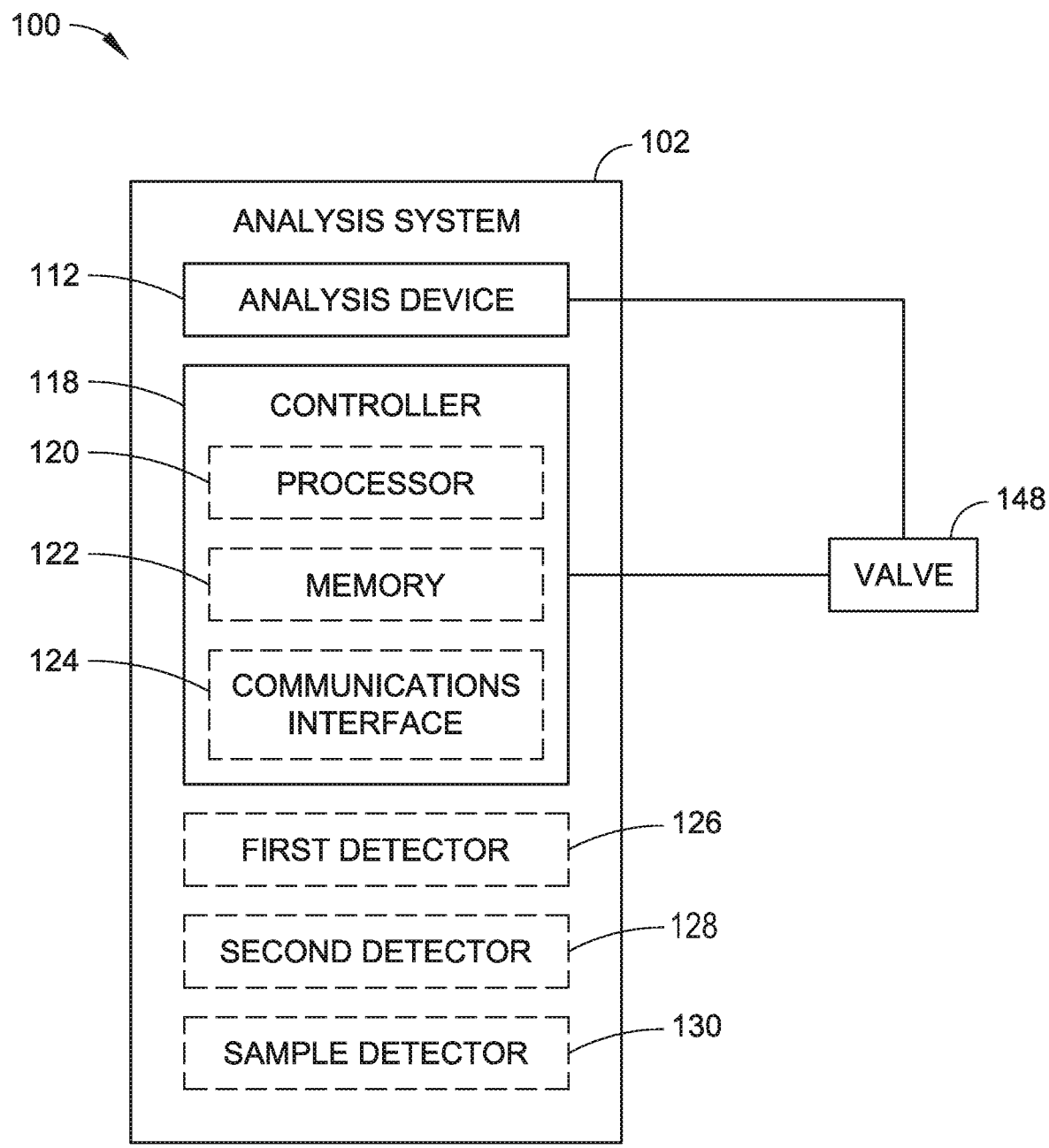
FIG. 4 is a partial line diagram illustrating an analysis system within the system configured to analyze samples transported over long distances in accordance with example embodiments of the present disclosure.

Referring now to FIG. 4, in an example embodiment of the disclosure, the analysis system 102 can include one or more detectors configured to determine that the sample loop 164 contains a sufficient amount of the continuous liquid sample segment for analysis by the analysis system 102. In one example, a sufficient amount of the continuous liquid sample can include enough liquid sample to send to the analysis device 112. Another example of a sufficient amount of the continuous liquid sample can include a continuous liquid sample in the sample receiving line 162 between a first detector 126 and a second detector 128 (e.g., as further shown in FIG. 7). The system 100, including some or all of its components, can operate under computer control, such as, through a controller 118. For example, the controller 118 can include a processor 120 to control the components and functions of systems described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

For instance, one or more components of the system, such as the analysis system 102, remote sampling system 104, valves 148, pumps, and/or detectors (e.g., the first detector 126, the second detector 128, a sample detector 130) can be coupled with the controller 118 for controlling the collection, delivery, and/or analysis of samples 150. For example, the controller 118 can be configured to switch the valve 148 coupling the sample loop 164 to the analysis system 102 and direct a sample 150 from the sample loop 164 to the analysis system 102 when a successful "catch" is indicated by the first detector 126 and the second detector 128 (e.g., when both sensors detect liquid). Furthermore, the controller 118 can implement functionality to determine an "unsuccessful catch" (e.g., when the sample loop 164 is not filled with enough of a sample 150 for a complete analysis by the analysis system 102). In some embodiments, an "unsuccessful catch" may be determined based upon, for instance, variations in the signal intensity of a signal received from a sensor, such as the first detector 126 or the second detector 128. In other embodiments, an "unsuccessful catch" may be determined when the first detector 126 indicates a sample 150 in the sample receiving line 162 and a predetermined amount of time passes in which the second detector 128 has not indicated a sample 150 in the sample receiving line 162.

In some embodiments, the controller 118 may be communicatively coupled with an indicator at a remote location, such as the second location, and can provide an indication (e.g., an alert) at the second location when insufficient sample 150 is received at the first location. The indication can be used to initiate (e.g., automatically) additional sample collection and delivery. In some embodiments, the indicator may provide an alert to an operator (e.g., via one or more indicator lights, via a display readout, a combination thereof, etc.). Further, the indication can be timed and/or initiated based upon one or more predetermined conditions (e.g., only when multiple samples have been missed). In some embodiments, an indicator can also be activated based upon conditions measured at a remote sampling site. For instance, a detector 130 at the second location can be used to determine when sample 150 is being provided to a remote sampling system 104, and the indicator can be activated when sample 150 is not being collected.

In some embodiments, the controller 118 may be capable of providing different timing for the collection of samples from different remote locations, and/or for different types of samples 150. For example, the controller 118 can be alerted when a remote sampling system 104 is ready to deliver a sample 150 to the sample transfer line 144, and can initiate transfer of the sample 150 into the sample transfer line 144. The controller 118 can also be communicatively coupled with one or more remote sampling systems 102 to receive (and possibly log/record) identifying information associated with samples 150, and/or to control the order that samples 150 are delivered within the system 100. For example, the controller 118 can remotely queue multiple samples 150 and coordinate their delivery through one or more of the sample transfer lines 144. In this manner, delivery of samples 150 can be coordinated along multiple simultaneous flow paths (e.g., through multiple sample transfer lines 144), one or more samples 150 can be in transfer while one or more additional samples 150 are being taken, and so on.

As indicated in FIG. 4, the controller 118 can include a processor 120, a memory 122, and a communications interface 124. The processor 120 may provide processing functionality for the controller 118 and can include any number of processors, micro-controllers, or other processing systems, and resident or external memory for storing data and other information accessed or generated by the controller 118. The processor 120 can execute one or more software programs that implement techniques described herein. The processor 120 is not limited by the materials from which it is formed or the processing mechanisms employed therein and, as such, can be implemented via semiconductor(s) and/or transistors (e.g., using electronic integrated circuit (IC) components), and so forth.

The memory 122 is an example of tangible, computer-readable storage medium that provides storage functionality to store various data associated with operation of the controller 118, such as software programs and/or code segments, or other data to instruct the processor 120, and possibly other components of the controller 118, to perform the functionality described herein. Thus, the memory 122 can store data, such as a program of instructions for operating the system 100 (including its components), and so forth. It should be noted that while a single memory is described, a wide variety of types and combinations of memory (e.g., tangible, non-transitory memory) can be employed. The memory 122 can be integral with the processor 120, can comprise stand-alone memory, or can be a combination of both.

The memory 122 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the system 100 and/or the memory 122 can include removable integrated circuit card (ICC) memory, such as memory 122 provided by a subscriber identity module (SIM) card, a universal subscriber identity module (USIM) card, a universal integrated circuit card (UICC), and so on.

The communications interface 124 is operatively configured to communicate with components of the system. For example, the communications interface 124 can be configured to transmit data for storage in the system 100, retrieve data from storage in the system 100, and so forth. The communications interface 124 may also be communicatively coupled with the processor 120 to facilitate data transfer between components of the system 100 and the processor 120 (e.g., for communicating inputs to the processor 120 received from a device communicatively coupled with the controller 118). It should be noted that while the communications interface 124 is described as a component of a controller 118, one or more components of the communications interface 124 can be implemented as external components communicatively coupled to the system 100 via a wired and/or wireless connection. The system 100 can also comprise and/or connect to one or more input/output (I/O) devices (e.g., via the communications interface 124), including, but not necessarily limited to: a display, a mouse, a touchpad, a keyboard, and so on.

The communications interface 124 and/or the processor 120 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a Wi-Fi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 124 can be configured to communicate with a single network or multiple networks across different access points.

Figure 5:
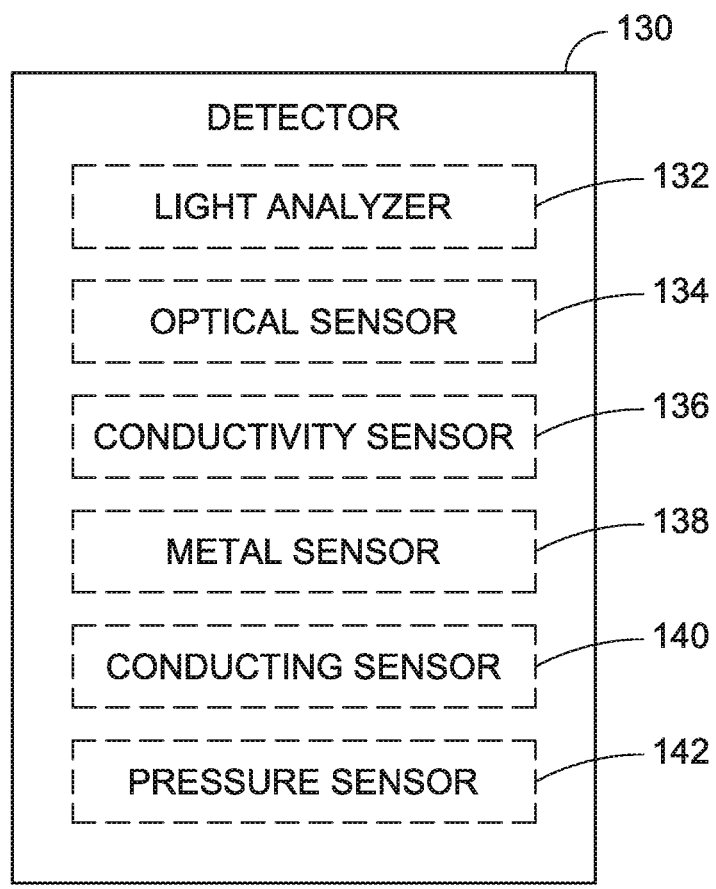
FIG. 5 is a partial line diagram illustrating a detector that can be utilized within the analysis system shown in FIG. 4 in accordance with example embodiments of the present disclosure.

Referring now to FIG. 5, in an example implementation, a sample detector 130, such as the first detector 126 and/or the second detector 128 of FIG. 4 may include a light analyzer 132, an optical sensor 134, a conductivity sensor 136, a metal sensor 138, a conducting sensor 140, and/or a pressure sensor 142. It is contemplated that the first detector 126 and/or the second detector 128 may include other sensors. For example, the first detector 126 may include a light analyzer 132 that detects when the sample 150 enters the sample loop 164, and the second detector 128 may include another light analyzer 132 that detects when the sample loop 164 is filled. This example can be referred to as a "successful catch." It should be noted that the light analyzers 132 are provided by way of example only and are not meant to limit the present disclosure. Other example detectors include, but are not necessarily limited to: optical sensors, conductivity sensors, metal sensors, conducting sensors, pressure sensors, and so on.

Figure 6:
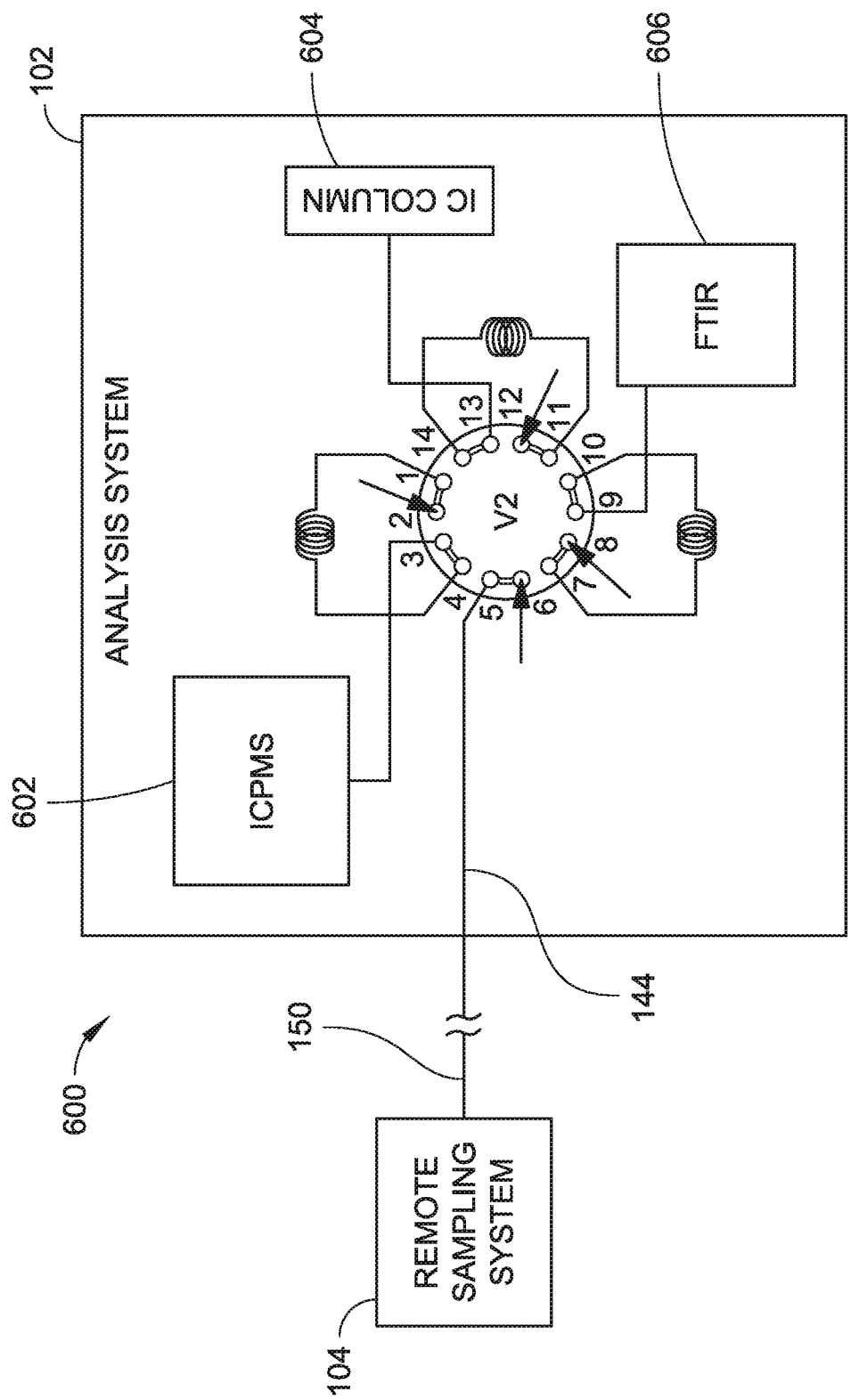
FIG. 6 is an environmental view illustrating an analysis system having a plurality of analysis devices to analyze a sample received from a remote sampling system in accordance with example embodiments of the present disclosure.

Referring now to FIG. 6, an example system 600 includes the remote sampling system 104 in fluid communication with the analysis system 102, wherein the analysis system 102 includes a multiposition valve 610 coupled with three analysis devices (shown as ICPMS 602, ion chromatograph (IC) Column 604, and Fourier transform infrared spectroscopy (FTIR) 606) for analysis of the sample received from the remote sampling system 104. While FIG. 6 shows an embodiment where the analysis system 102 includes three analysis devices, the analysis system 102 can include fewer (e.g., less than three) or more (e.g., more than three) analysis devices 112.

Figure 7:
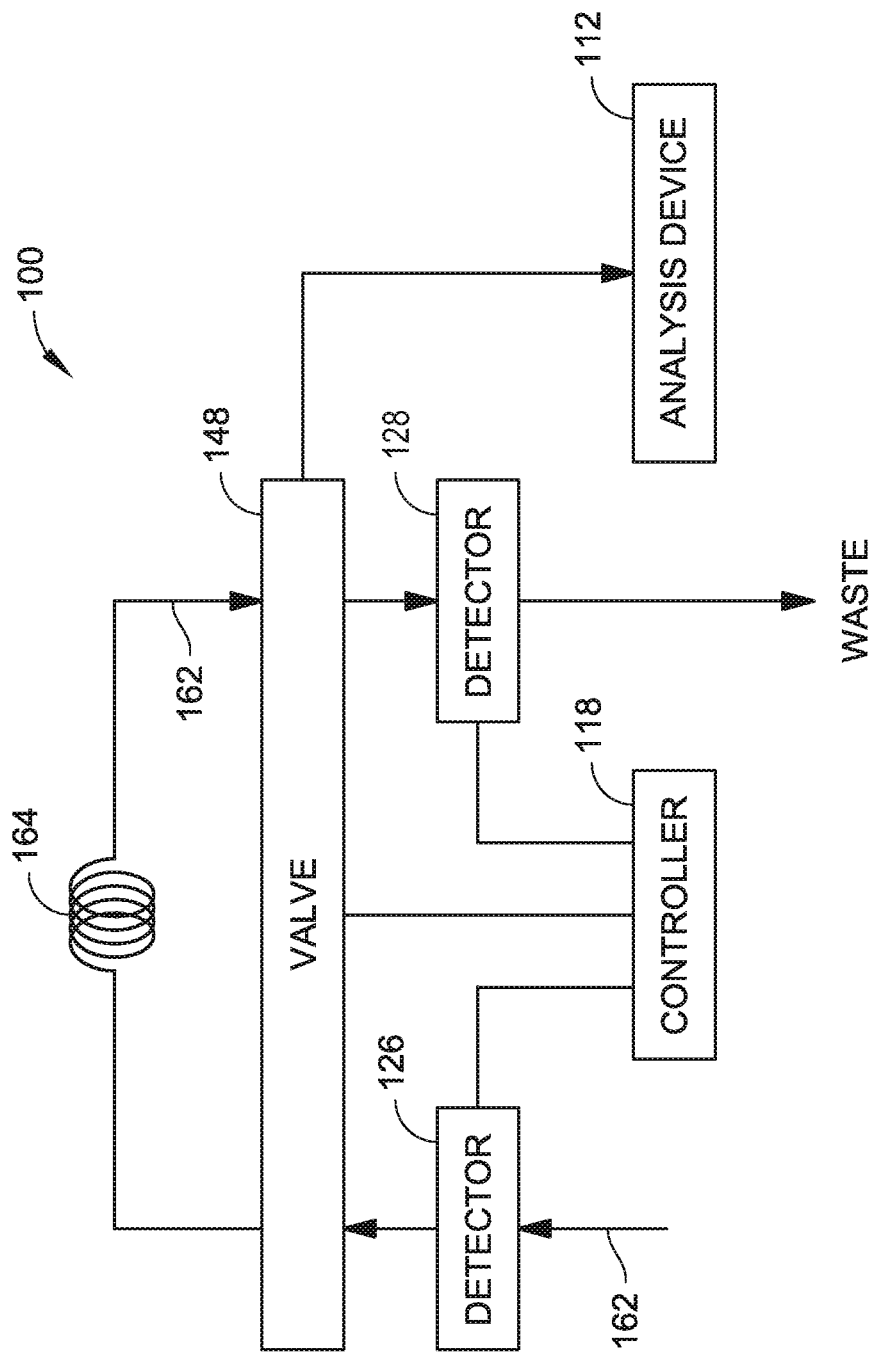
FIG. 7 is a diagrammatic illustration of a system including a sample receiving line and detectors configured to determine when the sample receiving line contains a continuous liquid segment between the detectors in accordance with example embodiments of the present disclosure.

Referring now to FIG. 7, an example system 100 can determine when a continuous liquid sample segment is contained in a sample receiving line 162 and/or when a sample loop 164 contains a sufficient amount of the continuous liquid sample segment for analysis (e.g., by the analysis system 102). In example embodiments, a first detector 126 can be configured to determine two or more states, which can represent the presence of liquid (e.g., a liquid sample segment) at a first location in the sample receiving line 162, the absence of liquid at the first location in the sample receiving line 162, and so forth. For example, a first state (e.g., represented by a first logic level, such as a high state) can be used to represent the presence of a liquid sample segment at the first location in the sample receiving line 162 (e.g., proximate to the first detector 126), and a second state (e.g., represented by a second logic level, such as a low state) can be used to represent the absence of a liquid sample segment at the first location in the sample receiving line 162 (e.g., a void or gas in the sample receiving line 162).

In some embodiments, a first detector 126 may include a pressure sensor 142 that can be used to detect the presence of liquid at the first location in the sample receiving line 162 (e.g., by detecting an increase in pressure in the sample receiving line 162 proximate to the first location when liquid is present). The first detector 126 can also be used to detect the absence of liquid at the first location in the sample receiving line 162 (e.g., by detecting a decrease in pressure in the sample receiving line 162 proximate to the first location). However, a pressure sensor is provided by way of example and is not meant to limit the present disclosure. In other embodiments, a first detector 126 may include an optical sensor 134 that can be used to detect the presence of liquid at the first location in the sample receiving line 162 (e.g., by detecting a reduction in light passing through the sample receiving line 162 proximate to the first location when liquid is present). The first detector 126 can also be used to detect the absence of liquid at the first location in the sample receiving line 162 (e.g., by detecting an increase in light passing through the sample receiving line 162 proximate to the first location). In these examples, the first detector 126 can report the presence of liquid sample at the first location as a high state and the absence of liquid sample at the first location as a low state.

In some embodiments, the system 100 may also include one or more additional detectors, such as a second detector 128, a third detector, and so forth. For example, the second detector 128 can also be configured to determine two or more states, which can represent the presence of liquid (e.g., a liquid sample segment) at a second location in the sample receiving line 162, the absence of liquid at the second location in the sample receiving line 162, and so forth. For example, a first state (e.g., represented by a first logic level, such as a high state) can be used to represent the presence of a liquid sample segment at the second location in the sample receiving line 162 (e.g., proximate to the second detector 128), and a second state (e.g., represented by a second logic level, such as a low state) can be used to represent the absence of a liquid sample segment at the second location in the sample receiving line 162.

In some embodiments, the second detector 128 may include a pressure sensor 142 that can be used to detect the presence of liquid at the second location in the sample receiving line 162 (e.g., by detecting an increase in pressure in the sample receiving line 162 proximate to the second location when liquid is present). The second detector 128 can also be used to detect the absence of liquid at the second location in the sample receiving line 162 (e.g., by detecting a decrease in pressure in the sample receiving line 162 proximate to the second location). However, a pressure sensor is provided by way of example and is not meant to limit the present disclosure. In other embodiments, a second detector 126 comprising an optical sensor 134 can be used to detect the presence of liquid at the second location in the sample receiving line 162 (e.g., by detecting a reduction in light passing through the sample receiving line 162 proximate to the second location when liquid is present). The second detector 126 can also be used to detect the absence of liquid at the second location in the sample receiving line 162 (e.g., by detecting an increase in light passing through the sample receiving line 162 proximate to the second location). In these examples, the second detector 128 can report the presence of liquid sample at the second location as a high state and the absence of liquid sample at the second location as a low state.

A controller 118 (shown in FIG. 4) can be communicatively coupled with one or more detector(s) 126, 128 and can register liquid at the first location in the sample receiving line 162, the second location in the sample receiving line 162, another location in the sample receiving line 162, and so on. For example, the controller 118 may initiate a detection operation using a first detector 126, and liquid at the first location in the sample receiving line 162 can be registered by the controller 118 (e.g., when the controller 118 registers a change of state from low to high as determined by the first detector 126). Then, the first detector 126 may be monitored (e.g., continuously, at least substantially continuously), and the controller 118 can subsequently register an absence of liquid at the first location in the sample receiving line 162 (e.g., when the controller 118 registers a change of state from high to low as determined by the first detector 126).

Similarly, the controller 118 can also initiate a detection operation using a second detector 128, and liquid at the second location in the sample receiving line 162 can be registered by the controller 118 (e.g., when the controller 118 registers a change of state from low to high as determined by the second detector 126). Then, the second detector 128 may be monitored (e.g., continuously, at least substantially continuously), and the controller 118 can subsequently register an absence of liquid at the second location in the sample receiving line 162 (e.g., when the controller 118 registers a change of state from high to low as determined by the second detector 128).

The controller 118 and/or one or more detectors 126, 128 can include or influence the operation of a timer to provide timing of certain events (e.g., presence or absence of liquids at particular times at multiple locations in the sample receiving line 162) for the system 100. As an example, the controller 118 can monitor the times at which changes of state are registered by the various detector(s) in order to make determinations as to whether to allow the liquid sample to be directed to the analysis system 102 (e.g., as opposed to directing the liquid to waste or a holding loop). As another example, the controller 118 can monitor the time that a liquid spends in the sample receiving line 162 and/or the sample loop 164 based upon the change of states registered by the controller 118 via the detector(s) 126, 128.

Figure 8A:
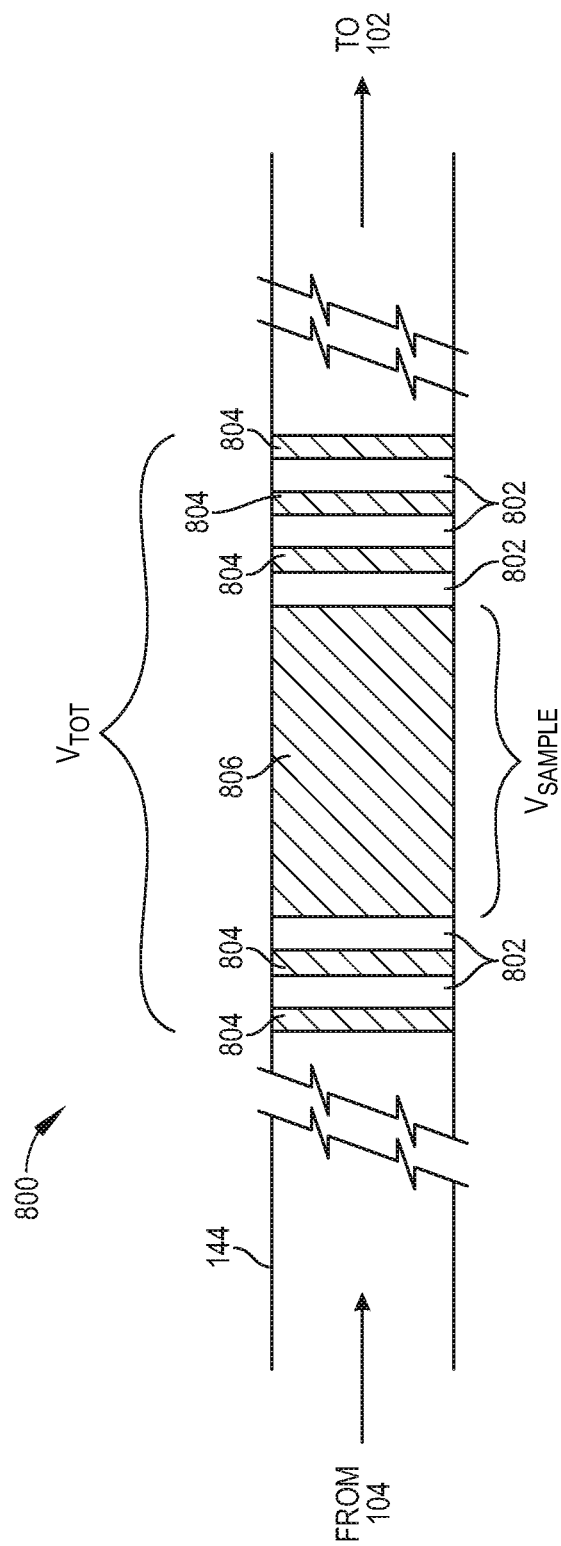
FIG. 8A is a partial cross section of a sample transfer line containing multiple segments of a sample obtained by a remote sampling system in accordance with example embodiments of the present disclosure.

Referring now to FIG. 8A, the sample transfer line 144 may include multiple sample segments. Generally, when a sample is obtained proximate an associated analysis device (e.g., an autosampler next to an analysis device), the sample can span the entire distance between the sample source and the analysis device without requiring substantial sample amounts. However, for long-distance transfer of a sample, filling the entire transfer line 144 (indicated in FIGS. 2A and 2B) between with the remote sampling system 104 and the analysis system 102 (e.g., up to hundreds of meters of sample length) could be prohibitive or undesirable, such as due to environmental concerns with disposing unused sample portions, viscosity of the sample, or the like. Accordingly, in embodiments, the remote sampling system 104 may not fill the entire transfer line 144 with sample, rather, a liquid sample segment representing a fraction of the total transfer line 144 volume may be sent through the transfer line 144 for analysis by the analysis system 102. For example, while the transfer line 144 can be up to hundreds of meters long, the sample may occupy about a meter or less of the transfer line 144 at any given time during transit to the analysis system 102. While sending liquid sample segments through the line can reduce the amount of sample sent from the remote sample systems 104, the sample can incur bubbles or gaps/voids in the sample transfer line 144 during transit to the analysis system 102. Such bubbles or gaps/voids can form due to circumstances associated with long-distance transfer of the sample such as changes in orifices between tubing during transit, due to interaction with residual cleaning fluid used to clean the lines between samples, due to reactions with residual fluid in the lines, due to pressure differential(s) along the span of transfer line, or the like.

In an example embodiment, a liquid sample 800 can be sent from the remote sampling system 104 through the transfer line 144 to the first location where the analysis system 102 is located. The volume of the total sample obtained by the remote sampling system 104 may be represented by $V_{TOT}$ in FIG. 8A. As shown, gaps or voids 802 can form in the transfer line 144 during transit from the remote sampling system 104. The gaps or voids 802 may partition a number of sample segments 804 that may not contain sufficient amounts or volume of sample for analysis by the analysis system 102. Such sample segments 804 can precede and/or follow a larger sample segment 806 having a volume (shown as $V_{SAMPLE}$) sufficient for analysis by the analysis system 102. In embodiments, the quantity of sample collected by the remote sampling system 104 (e.g., $V_{TOT}$) may be adjusted to provide a sufficient amount of sample 150 for analysis by the analysis device 112. For instance, the volumetric ratio of the amount of sample 150 "pitched" to the amount of sample 150 "caught" (e.g., $V_{TOT}/V_{SAMPLE}$) may be at least approximately one and one-quarter (1.25). However, this ratio is provided by way of example only and is not meant to limit the present disclosure. In some embodiments the ratio may be greater than one and one-quarter, and in other embodiments the ratio may be less than one and one-quarter. In an example embodiment, two and one-half milliliters (2.5 mL) of sample 150 (e.g., concentrated sulfuric acid or nitric acid) may be pitched, and one milliliter (1 mL) of sample 150 may be caught. In another example embodiment, one and one-half milliliters (1.5 mL) of sample 150 may be pitched, and one milliliter (1 mL) of sample 150 may be caught. In embodiments of the disclosure, the amount of sample 150 "pitched" may be adjusted to account for the distance between the first location and the second location, the amount of sample transfer line tubing between the first location and the second location, the pressure in the sample transfer line 144, and so forth. In general, the ratio of $V_{TOT}/V_{SAMPLE}$ can be greater than one to account for the formation of the gaps/voids 802 and sample segments 804 in the sample transfer line 144 during transfer.

In some embodiments, the system 100 can facilitate transfer of suitable continuous liquid sample segments through control of the gas pressure supplied to the sample in transfer line 144. For instance, for samples having a low surface tension or having a surfactant to artificially lower the surface tension of the sample, sudden application of gas pressure to the sample to push the sample through the transfer line 144 may introduce gas bubbles to the sample, causing the gaps or voids 802 to form smaller sample segments 804 instead of the continuous liquid sample segment 806 suitable for analysis by the analysis system 102. The sudden application of gas pressure can be due to regulation of gas flow from the gas supply 146 from an off configuration to a full on configuration (e.g., a predetermined transfer pressure to transfer the sample 150 through the transfer line 144). In implementations, a flow controller is coupled to the gas supply to regulate the pressure of gas provided from the gas supply 146 to the sample for transfer through the transfer line 144 with periodic or gradual increases in pressure over time. For example, the flow controller can regulate the gas flow from the gas supply 146 from a first state (e.g., an off state, a base pressure, zero pressure, etc.) with continuous or periodic increases in pressure over a time period until reaching a second state (e.g., a predetermined transfer pressure, a maximum transfer pressure, etc.). In an implementation, the time period in which to increase the pressure may be approximately one minute from the first state to the second state. The increases in pressure can include, but are not limited to, linear increases in pressure, nonlinear increases in pressure, periodic or step-based increases in pressure, or combinations thereof. In implementations, the flow controller can control the pressure increase according to a sample identity of the sample to be transferred from the remote sampling system 104. For example, the flow controller can operate under computer control to regulate the appropriate pressure increase regimen, such where the computer can access a table having preset pressure increase regimens associated with particular sample identities. For a given sample identity, the computer can identify the sample identity of the sample to be transferred from the remote sampling system 104, load the corresponding pressure increase regimen for the flow controller to regulate the pressure increase in the gas flow from the gas supply 146 to transfer the sample. In implementations, the flow controller is used in combination with the backpressure system 200 described herein, with an optional buffer liquid introduction system 300 described in reference to FIG. 8C, or combinations thereof.

Figure 8B:
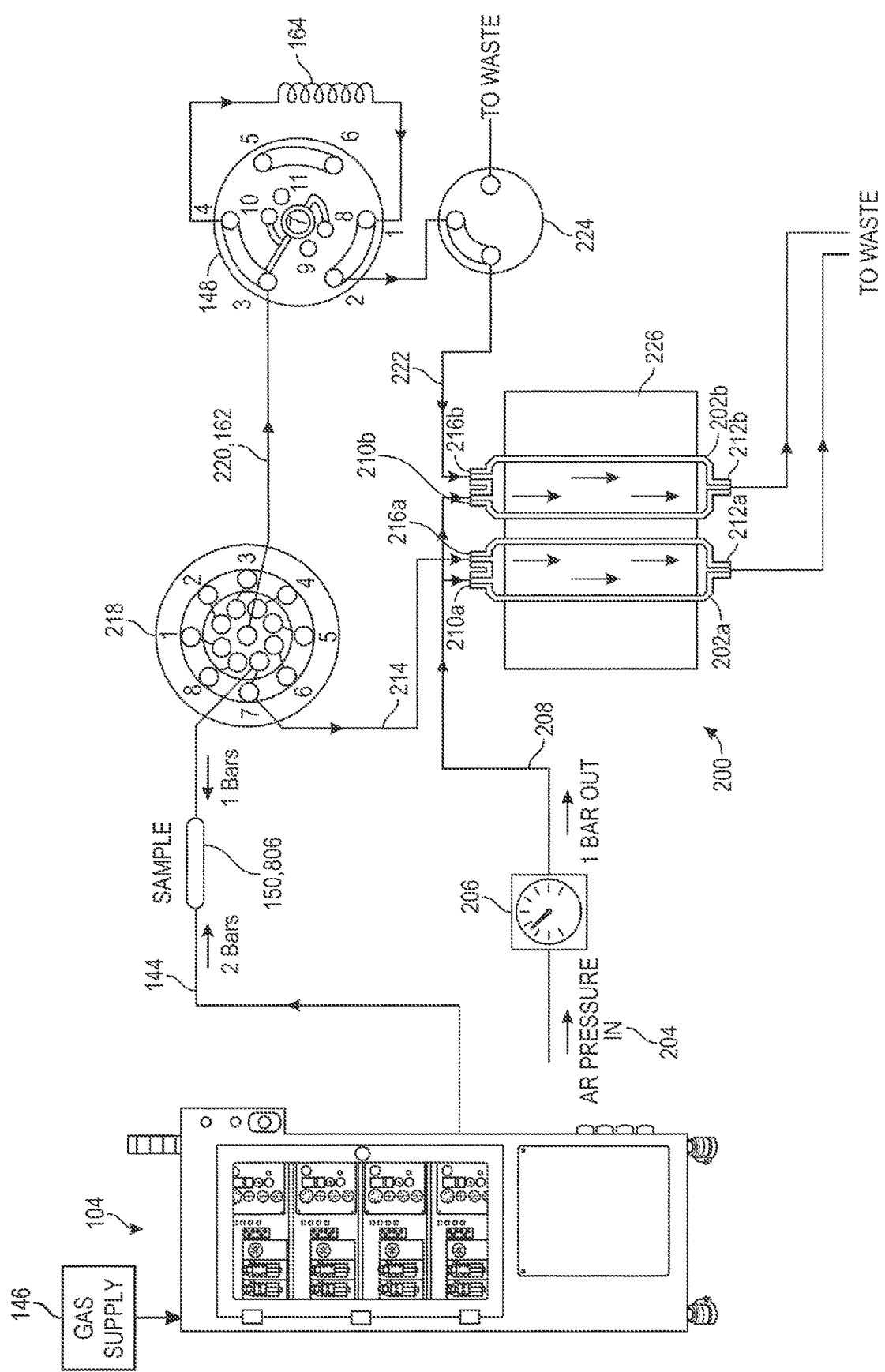
FIG. 8B is a diagrammatic illustration of pressurized transfer with applied backpressure of a remote sample from a remote sampling device to a sample loop in accordance with example embodiments of the present disclosure.

Referring now to FIG. 8B, in an example embodiment, the system 100 can facilitate transfer of suitable continuous liquid sample segments through the introduction of a backpressure within the system 100 (e.g., during transfer of the sample 150 through the transfer line 144). For example, the system 100 can include a backpressure system 200 configured to introduce a backpressure to the transfer line 144 during transit of a sample from the remote sampling system 104, where the sample can include a fluid with a high vapor pressure, low surface tension, or other characteristic that could cause a tendency for the sample to naturally segment or degas within the transfer line. The backpressure system 200 is shown having two backpressure chambers 202a and 202b fluidically coupled with a gas pressure source 204 to receive pressurized gas within the backpressure chambers 202a and 202b. While two backpressure chambers are shown, the system 100 is not limited to two backpressure chambers and can include fewer than two back pressure chambers or more than two backpressure chambers. The gas pressure source 204 can include a source for an inert gas, including but not limited to Argon, to provide backpressure against the transfer of the sample 150 through the transfer line 144.

The gas pressure source 204 can be coupled with a pressure regulator 206 to control an output pressure of gas from the gas pressure source 204 to be received by the backpressure chambers 202a and 202b. In general, the pressure regulator 206 may control the output pressure of gas from the gas pressure source 204 to supply a backpressure to the transfer line 144 that may be less than a transfer pressure supplied by the remote sampling system 104 to permit passage of the sample through the transfer line 144 while maintaining a continuous liquid sample segment 806. For example, the pressure regulator 206 can supply a 1 bar pressure of gas from the gas pressure source 204 to the backpressure chambers 202a and 202b, whereas the remote sampling system 104 can supply the sample 150 at a pressure that may exceed the 1 bar backpressure, such as a supply pressure of 2 bars or the like, to transfer the sample 150 through the transfer line 144 toward the sample loop 164. In implementations, the remote sampling system 104 may include a controller to control flow rate or pressure differential or a combination of both flow rate and pressure differential to maintain sample flow. This may be based on the type of sample that may be introduced to the system 100. For instance, the controller may control a gas regulator that may supply a constant pressure higher than the back pressure system for transfer. In other embodiments, the controller may control a mass flow controller to push a desired mass flow rate of sample from the remote sampling system 104 through the transfer line 144. The mass flow controller can provide a constant flow of fluid in the transfer line 144 by controlling a gas supply (e.g., gas supply 146) to push against the fluid through the transfer line 144, where the pressure of the gas supply can be controlled or varied by the mass flow controller. For example, the mass flow controller can alter the pressure of gas supplied to the transfer line 144 to maintain a preset flow rate or change to another flow setting based on changes in conditions of the transfer line 144 during transfer, changes in backpressure, or the like.

Figure 8C:
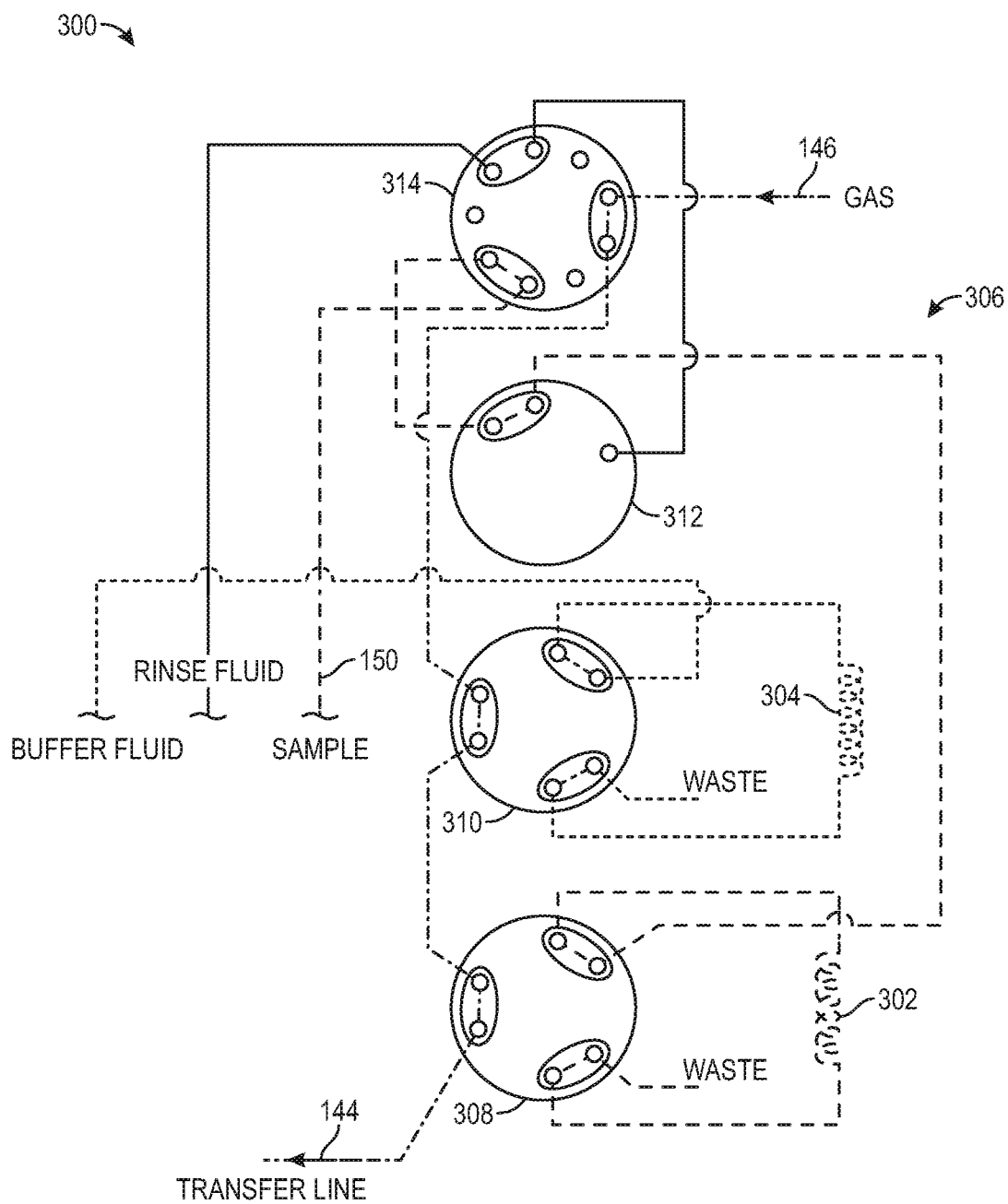
FIG. 8C is a diagrammatic illustration of an optional buffer liquid introduction system to facilitate transfer of a remote sample from a remote sampling device to a sample loop in accordance with example embodiments of the present disclosure.

Referring now to FIG. 8C, an optional buffer liquid introduction system 300 may be described. The system 100 of FIGS. 1 through 8B may facilitate transfer of suitable continuous liquid sample segments through applying gas pressure to a buffer liquid located in the transfer line 144 between a sample to be sent to the analysis system 102 and the remote sampling system 104. For example, for samples that may have a low surface tension or having a surfactant to artificially lower the surface tension of the sample, sudden application of gas pressure to the sample to push the sample through the transfer line 144 can introduce gas bubbles to the sample, causing the gaps or voids 802 to form smaller sample segments 804 instead of the continuous liquid sample segment 806 suitable for analysis by the analysis system 102. In implementations, the remote sampling system 104 may introduce the sample 150 to the transfer line 144 and may subsequently introduce a buffer liquid (e.g., DI water) to the transfer line 144. A gap or void 802 or gas pocket may be present between the sample 150 and the buffer liquid, such as through initial presentation of gas from the gas supply 146, void space between a valve holding a loop with the buffer liquid and a valve holding a loop with the sample, or the like. The remote sampling system 104 can then introduce gas flow from the gas supply 146 to push against the buffer liquid, which in turn pushes against the gap or void 802 or gas pocket between the sample 150 and the buffer liquid to push the sample 150 (e.g., continuous liquid sample segment 806) through the transfer line 144.

Referring again to FIG. 8C, the buffer liquid introduction system (e.g., at one or more remote sampling systems 104) may introduce a buffer liquid into the transfer line between gas from the gas supply 146 and the sample 150. The buffer liquid introduction system 300 may be in a load configuration in FIG. 8C to load the sample 150 into a sample loop 302 and to load the buffer liquid into a buffer loop 304. The buffer liquid introduction system 300 may include a valve system 306 including one or more valves (e.g., rotary valves, selection valves, multi-port valves, etc.) to control the fluid flow pathways through the buffer liquid introduction system 300 to manipulate the fluids introduced to the transfer line 144. For example, the valve system 306 can include valves 308, 310, 312, and 314 switchable between a plurality of configurations to direct the flow of fluids through the buffer liquid introduction system 300. In the loading configuration, the sample 150 may be directed through valve 314 to valve 312, which may then direct the sample 150 to valve 308 and into the sample loop 302, with excess flow going to waste. The loading configuration can also include loading of the buffer fluid into the buffer loop 304. For example, the buffer fluid (e.g., DI water) may be directed to valve 310 and into the buffer loop 304. In implementations, loading of the sample loop 302 with sample and loading of the buffer loop 304 with buffer fluid may occur substantially simultaneously. Alternatively, the buffer fluid can be provided to valve 310 on a continuous or intermittent basis to fill the buffer loop 304 whenever the valve 310 is in the loading configuration. Gas can be supplied to the transfer line 144 during the loading configuration, such as providing gas from the gas supply 146 to valve 314, which may be fluidically coupled to valve 310 which may be fluidically coupled to valve 308 in the loading configuration.

Figure 8D:
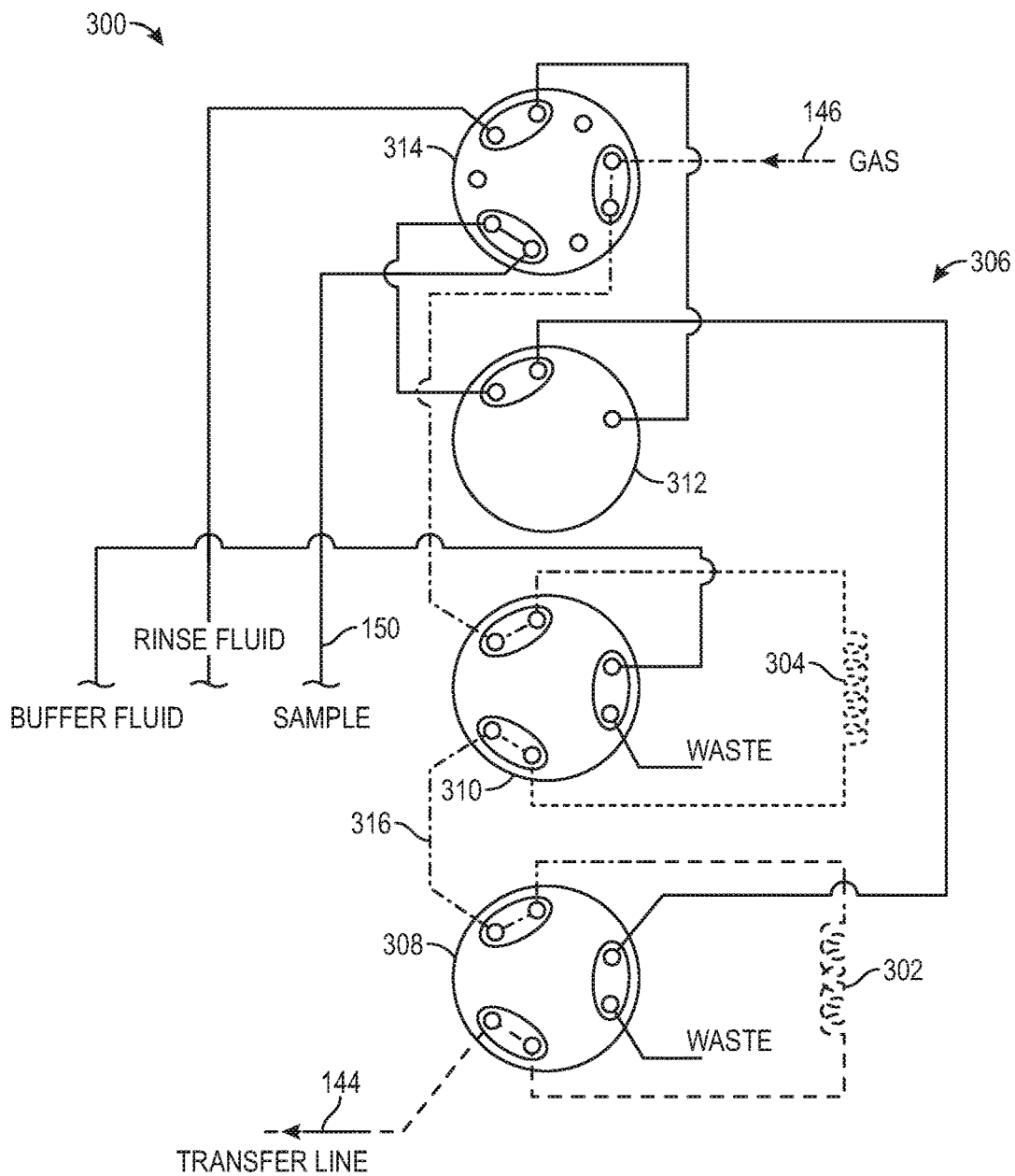
FIG. 8D is a diagrammatic illustration of the buffer liquid introduction system of FIG. 8C in a transfer configuration.
Figure 8E:
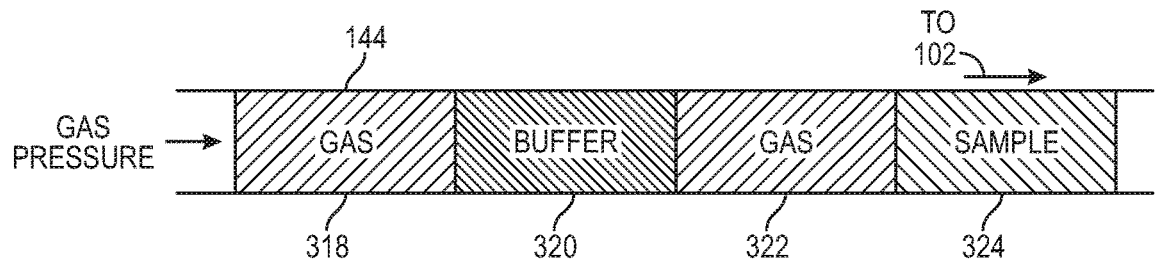
FIG. 8E is a diagrammatic illustration of a transfer line having gas segments, a buffer fluid segment, and a sample segment in accordance with example embodiments of the present disclosure.

Referring now to FIG. 8D, the buffer liquid introduction system 300 may be in a transfer configuration to push the fluids held in the buffer loop 304 and in the sample loop 302 into the transfer line 144 to transfer the sample to the analysis system 102 for analysis. For example, in the transfer configuration, gas from the gas supply 146 may be directed to valve 310 to push the buffer fluid held in the buffer loop 304 out of the buffer loop 304 towards valve 308, the buffer fluid may push against gas present in a fluid line 316 that may provide fluid communication between valve 310 and valve 308. The gas present in the fluid line 316 may in turn push against the sample held in the sample loop 302 to push the sample into the transfer line 144. For instance, referring to FIG. 8E, an example of the transfer line 144 is shown, where gas pressure from the gas supply 146 may cause gas 318 to push the buffer fluid 320 against another section of gas 322 (e.g., gas present in the fluid line 316 between the loading and transfer configurations) which in turn may push against the sample segment 324 to transfer to the analysis system 102. In implementations, the buffer fluid 320 may provide a barrier between the gas 318 and the sample segment 324 to maintain a continuous liquid sample segment (e.g., continuous liquid sample segment 806) suitable for analysis by the analysis system 102, such as by preventing the gas 318 from introducing bubbles into the sample segment 324. For example, the buffer fluid 320 can compress the gas 322 to push against the sample segment 324 in a controlled manner while the buffer fluid 320 takes the force of the initial pressure from the gas 318, as opposed to the gas 318 pushing directly against the sample segment 324. Following transfer, a rinse procedure can introduce a rinse fluid (e.g., DI water) to the valve 312, which may switch configurations to introduce the rinse fluid to valve 310, through the buffer loop 304, into valve 308, and through the sample loop 302. Alternatively, the buffer fluid can clean the fluid lines during transfer without a separate rinse procedure. For example, the volume of the buffer loop 304 can be selected to provide sufficient volume of buffer fluid to rinse the fluid lines of the system 100 during transfer of the sample to the analysis system 102.

Figure 8F:
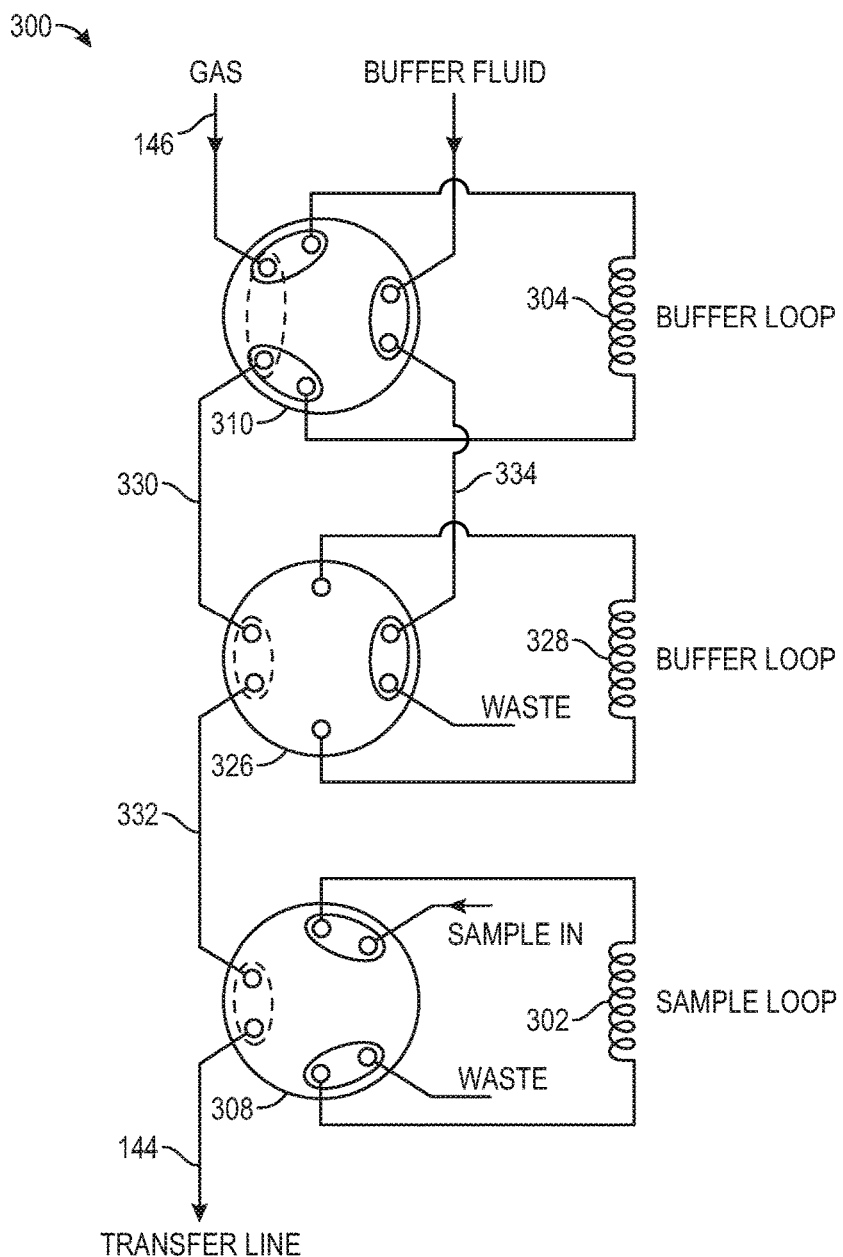
FIG. 8F is a diagrammatic illustration of a buffer liquid introduction system to facilitate transfer of a remote sample from a remote sampling device to a sample loop in accordance with example embodiments of the present disclosure.

Referring now to FIG. 8F, in an example implementation, multiple buffer fluids can be introduced to the transfer line 144 to provide buffer against the gas pressure from the gas supply 146. A valve 326 having a second buffer loop 328 can be inserted between valve 310 and valve 308, with fluid line 330 coupled between valve 310 and valve 326 and with fluid line 332 coupled between valve 308 and valve 326. Between loading and transfer configurations, gas can be present in the fluids lines 330 and 332 to provide gas spacing between the sample and one of the buffer fluids or between the respective buffer fluids. A fluid line 334 can couple valve 310 with valve 326 to provide fluid connection from a buffer fluid source to each of valve 310 and valve 326 to fill the buffer loop 304 and the second buffer loop 328. Alternatively, a different buffer fluid can be introduced to valve 326 to provide differing buffer fluids in the transfer line 144 during transfer of the sample to the analysis system.

Figure 8G:
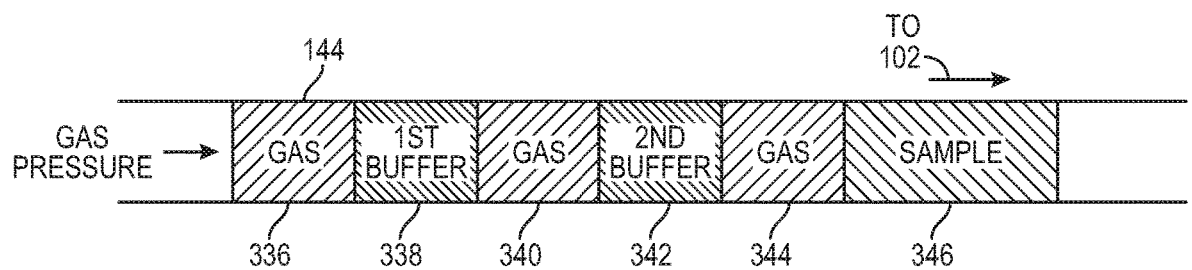
FIG. 8G is a diagrammatic illustration of a transfer line having gas segments, buffer fluid segments, and a sample segment in accordance with example embodiments of the present disclosure.

Referring now to FIG. 8G, in an example embodiment, the transfer line 144 is shown, where gas pressure from the gas supply 146 may cause gas 336 to push the first buffer fluid 338 (e.g., held in buffer loop 304) against another section of gas 340 (e.g., gas present in the fluid line 330 between the loading and transfer configurations) which may push against the second buffer fluid 342 (e.g., held in the second buffer loop 328) which may push against a further section of gas 344 (e.g., gas present in the fluid line 332 between the loading and transfer configurations) which in turn may push against the sample segment 346 to transfer to the analysis system 102. In implementations, the buffer fluids 338 and 342 may provide barriers between the gas 336 and the sample segment 346 to maintain a continuous liquid sample segment (e.g., continuous liquid sample segment 806) suitable for analysis by the analysis system 102, such as by preventing the gas 336 from introducing bubbles into the sample segment 346. For example, the buffer fluids 338 and 342 can compress the gas segments 340 and 344 to push against the sample segment 3346 in a controlled manner while the buffer fluid 338 takes the force of the initial pressure from the gas 336, as opposed to the gas 336 pushing directly against the sample segment 346. In implementations, the buffer liquid introduction system 300 may be used in combination with the backpressure system 200 described above, the flow controller described above, or combinations thereof.

In implementations, the system 100 can select which of a plurality of remote sampling systems 104 should transmit its respective sample to the analysis system 102 (e.g., "pitch"), whereby the detectors 126 facilitate determination of whether sufficient sample is present (e.g., $V_{SAMPLE}$ in the sample loop 164) to send to the analysis system 102 (e.g., "catch"), or whether a void or gap is present in the line (e.g., between the detectors 126), such that the sample should not be sent to the analysis system 102 at that particular time. If bubbles or gaps were to be present (e.g., in the sample loop 164), their presence could compromise the accuracy of the analysis of the sample, particularly if the sample were to be diluted or further diluted at the analysis system 102 prior to introduction to the analysis device 112, since the analysis device 112 could analyze a "blank" solution.

In some embodiments, a system 100 can be configured to determine when a continuous liquid sample segment (e.g., sample segment 806) is contained in a sample receiving line 162 and/or a sample loop 164, such that the system 100 can avoid transferring a gap or void 802 or smaller sample segment 804 to the analysis device 112. For example, the system 100 can include a first detector 126 at a first location along the sample receiving line 162 and a second detector 126 at a second location along the sample receiving line 162 (e.g., downstream from the first location), the system 100 may also include a sample loop 164 between the first detector 126 and the second detector 128. In embodiments, a valve, such as a multi-port valve switchable between at least two flow path configurations (e.g., a first flow path configuration of valve 148 shown in FIG. 3A; a second flow path configuration of valve 148 shown in FIG. 3B, etc.), can be positioned between the first detector 126 and the sample loop 164 and between the second detector 128 and the sample loop 164. In embodiments of the disclosure, the system 100 can determine that a continuous liquid sample segment is contained in the sample receiving line 162 and/or the sample loop 164 by registering liquid at both the first location and the second location at the same time, while not registering a change of state from high to low via the first detector 126 at the first location. Stated another way, the liquid sample may be transferred from the first detector 126 to the second detector 126 continuously, with no change in state detected by the first detector 126 until the second detector 126 recognizes the presence of the liquid sample.

Figure 9:
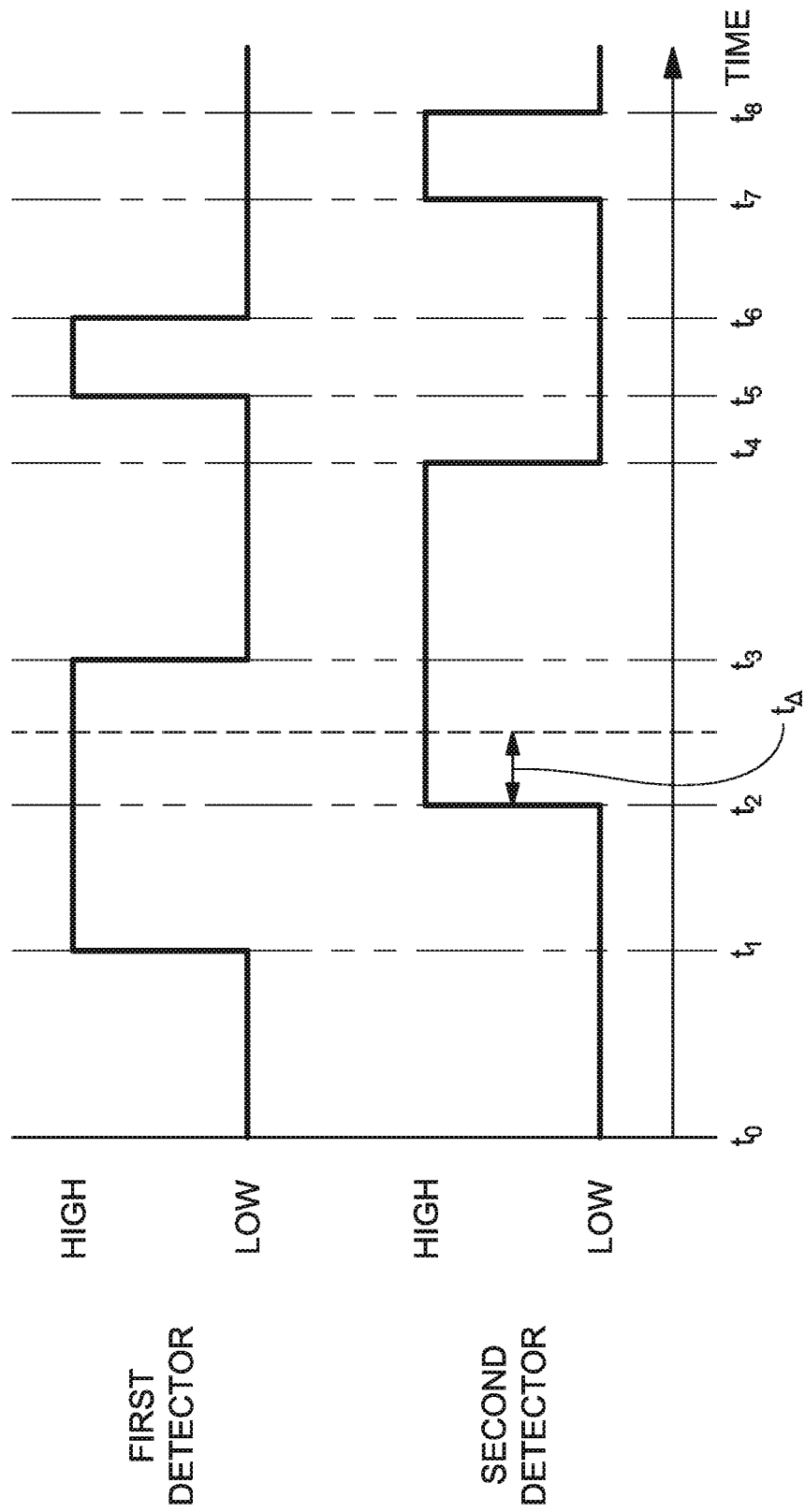
FIG. 9 is timeline illustrating multiple liquid sample segments supplied to a sample receiving line and registered by two detectors in accordance with example embodiments of the present disclosure.

Referring now to FIG. 9, a timeline illustrating multiple liquid sample segments supplied to a sample receiving line and registered by two example detectors is described. The timeline of FIG. 9 may be used in conjunction with the system 100 as described in FIG. 7 or any other systems and methods described in the specification. In an example implementation in which two or more detectors are used to determine when a sample receiving line contains a continuous liquid segment between the detectors, a liquid segment is received in a sample receiving line. For example, with reference to FIG. 7, sample receiving line 162 may receive a liquid sample segment. Then, the liquid segment may be registered at a first location in the sample receiving line by initiating a detection operation using a first detector that may be configured to detect a presence and/or an absence of the liquid segment at the first location in the sample receiving line. For example, with reference to FIG. 7, the first detector 126 may detect a liquid sample segment at the first location in the sample receiving line 162 as a change of state from low to high. With reference to FIG. 9, liquid sample segments can be detected at the first location at times $t_1$ and $t_5$. Then, subsequent to registering the liquid segment at the first location, the first detector may be monitored. For instance, with reference to FIG. 7, the first detector 126 may be monitored by the controller 118, and the first detector 126 may detect an absence of the liquid sample segment at the first location in the sample receiving line 162 as a change of state from high to low. With reference to FIG. 9, the first location may be monitored (e.g., continuously, at least substantially continuously) beginning at times $t_1$ and $t_5$, and an absence of the liquid sample segments can be detected at the first location at times $t_3$ and $t_6$.

Similarly, the liquid segment may be registered at a second location in the sample receiving line by initiating a detection operation using a second detector that may detect a presence and/or an absence of the liquid segment at the second location in the sample receiving line. For instance, with reference to FIG. 7, the second detector 126 may detect a liquid sample segment at the second location in the sample receiving line 162 as a change of state from low to high. With reference to FIG. 9, liquid sample segments can be detected at the second location at times $t_2$ and $t_7$. Then, subsequent to registering the liquid segment at the second location, the second detector may be monitored. For instance, with reference to FIG. 7, the second detector 126 may be monitored by the controller 118, and the second detector 126 may detect an absence of the liquid sample segment at the second location in the sample receiving line 162 as a change of state from high to low. With reference to FIG. 9, the second location may be monitored (e.g., continuously, at least substantially continuously) beginning at times $t_2$ and $t_7$, and an absence of the liquid sample segments can be detected at the second location at times $t_4$ and $t_8$.

When liquid is registered at both the first location and the second location at the same time, a continuous liquid segment may be registered in the sample receiving line between the first detector and the second detector. For instance, with reference to FIG. 7, when a high state represents the presence of a liquid sample segment at each of the first detector 126 and the second detector 126, the controller 118 may register a continuous liquid sample segment in the sample receiving line 162 (e.g., as present between the first detector 126 and the second detector 126). With reference to FIG. 9, a continuous liquid sample segment can be registered at time $t_2$ when a liquid sample segment is detected at the second location.

In some embodiments, a logical AND operation can be used to determine when a continuous liquid segment is registered in the sample receiving line and initiate transfer of the continuous liquid segment from the sample receiving line to analysis equipment. For instance, with reference to FIG. 7, the controller 118 can use a logical AND operation on a high state at each of the first detector 126 and the second detector 126 and may initiate a selective coupling of the sample loop 164 with the analysis device 112 using the valve 148 so that the sample loop 164 may be in fluid communication with the analysis device 112 to supply the continuous liquid sample segment to the analysis device 112. In some embodiments, the controller 118 may only determine whether to switch the valve 148 to supply a continuous liquid sample segment to the analysis device 112 when a state change from low to high is registered at the first detector 126 or the second detector 126. In some embodiments, the system 100 may require that the high state at the second detector 126 is maintained for a period of time (e.g., $t_A$ shown in FIG. 9) prior to initiating selective coupling of the sample loop 164 with the analysis device. For example, a timer or timing functionality of the controller 118 and/or processor 120 can verify the period of time that the second detector 126 has maintained the high state, whereby once the second detector 126 has maintained the high state for time $t_A$ (e.g., a threshold time) and where the first detector is in the high state, the controller 118 can determine that a sufficient liquid sample segment (e.g., segment 806 in FIG. 8A) has been caught, and can switch the valve 148 to supply the continuous liquid sample segment to the analysis device 112. The duration of $t_A$ can correspond to a time period beyond which it is unlikely for the second detector to be measuring a void or bubble, which can vary depending on flow rate of the sample or other transfer conditions.

In some embodiments, the controller 118 can monitor the timing of the first detector 126 at the high state and/or at the low state. For example, in embodiments where the flow characteristics of the sample being transferred from the remote sampling system 104 are known, the first detector 126 can be monitored to determine the length of time spent in the high state to approximate whether sufficient liquid sample would be present in the sample receiving line 162 and/or the sample loop 164 to cause the controller 118 to send the sample to the analysis device 112, either with or without confirmation of a high state at the second detector 126. For example, for a given flow rate of the sample, the volume of the sample can be approximated by monitoring the length of time that the first detector 126 has been in the high state. However, the flow rate of a sample may not be readily apparent due to fluctuations in pump functionality, type of sample transferred, viscosity of sample, duration of transfer, distance of transfer, ambient temperature conditions, transfer line 144 temperature conditions, or the like, so the functionality of the second detector 126 can be informative.

In embodiments of the disclosure, the systems and techniques described herein can be used to determine that a portion of a sample receiving line (e.g., a sample loop) between the first detector 126 and the second detector 126 is filled without the presence of bubbles. For example, the absence of liquid sample at the first location between times $t_3$ and $t_5$ as described with reference to FIG. 9 may correspond to the presence of a bubble in the sample receiving line 162. When the system 100 has reached a condition where no bubbles would be present in the sample receiving line 162, the controller 118 may switch valve 148 to allow the fluid in the sample loop 164 to pass to the analysis device 112 (for analysis or sample conditioning prior to analysis).

Figure 10:
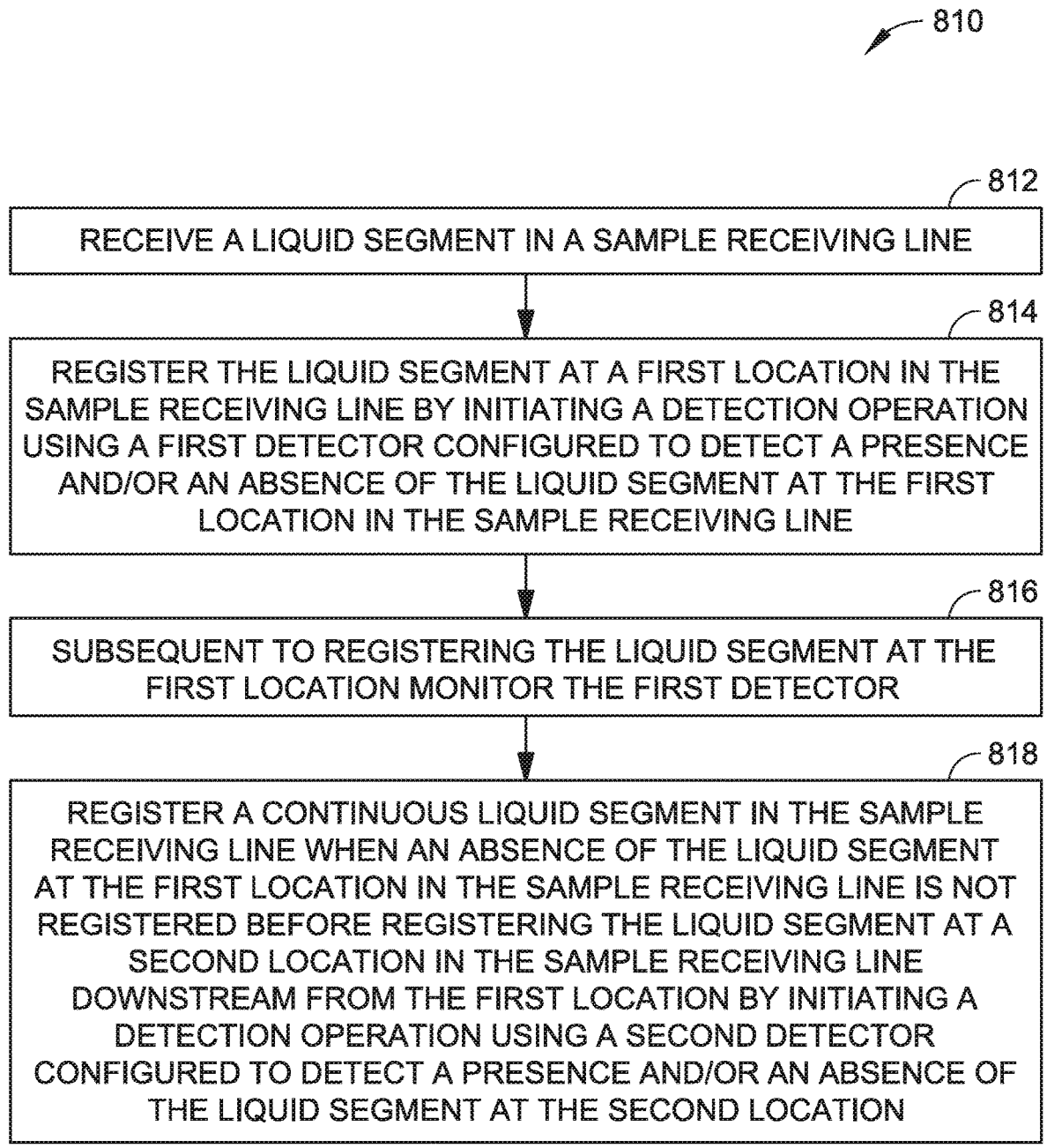
FIG. 10 is a flow diagram illustrating a method for determining when a sample receiving line contains a continuous liquid segment between detectors in accordance with example embodiments of the present disclosure.

Referring now to FIG. 10, an example procedure 810 is described in an example implementation in which two detectors are used to determine when a sample receiving line contains a sufficient amount of sample in a continuous liquid sample segment for analysis by an analysis system, with no gaps or voids in the continuous liquid sample segment. As shown, a liquid segment may be received in a sample receiving line (Block 812). For example, the sample receiving line 162 can receive the sample obtained by the remote sampling system 104 and transferred through transit line 144. The procedure 810 also includes registering the liquid segment at a first location in the sample receiving line with a first detector configured to detect the presence and/or absence of the liquid segment as it travels past the first location (Block 814). For example, the first detector 126 can measure the presence of the liquid sample segment at the first location in the sample receiving line 162. With reference to FIG. 9, liquid sample segments may be detected at the first location at times $t_1$ and $t_5$.

Next, subsequent to registering the liquid segment at the first location, the first detector may be monitored (Block 816). For instance, the first detector 126 can be monitored by the controller 118 to determine whether there is an absence of the liquid segment at the first location in the sample receiving line 162 (e.g., whether the first detector 126 has transitioned from a high state, indicating detection of sample fluid, to a low state, wherein no sample fluid is detected). With reference to FIG. 9, the first location may be monitored (e.g., continuously, at least substantially continuously) beginning at times $t_1$ and $t_5$. Then, a continuous liquid segment may be registered in the sample receiving line when an absence of the liquid segment at the first location in the sample receiving line is not registered before registering the liquid segment at a second location in the sample receiving line downstream from the first location by performing a detection operation using a second detector configured to detect a presence and/or an absence of the liquid segment at the second location (Block 818). For example, with reference to FIG. 9, the first detector 126 may detect the presence of the sample fluid at times $t_1$ and $t_5$, whereas the second detector 126 may detect the presence of the sample fluid at times $t_2$ and $t_7$. Only the liquid sample segment between times $t_1$ and $t_3$ at the first detector would be registered by the second detector (beginning at time $t_2$) without the first detector 126 detecting an absence in the interim time before the second detector detected that sample segment. At such time, the controller 118 could direct the valve 148 to switch to send the sample contained in the sample loop 164 to the analysis device 112. While the first detector 126 registers the presence of the liquid sample at $t_5$, the first detector 126 also detects the absence of the liquid sample at $t_6$, before the second detector 126 subsequently detects the presence of the liquid sample at $t_7$. As such, the system 100 may recognize that a gap or void (e.g., gap/void 802) is present in the sample loop 164 and may not switch the valve 148 for analysis, instead allowing the inadequate sample segment (e.g., liquid segment 804) to pass to waste. As described herein, a timer (e.g., implemented by the controller 118) can be used to cause the valve 148 to switch once the second detector 126 has maintained the high state for a certain period of time (e.g., $t_A$) after the first detector 126 has maintained the high state in the interim.

Figure 11:
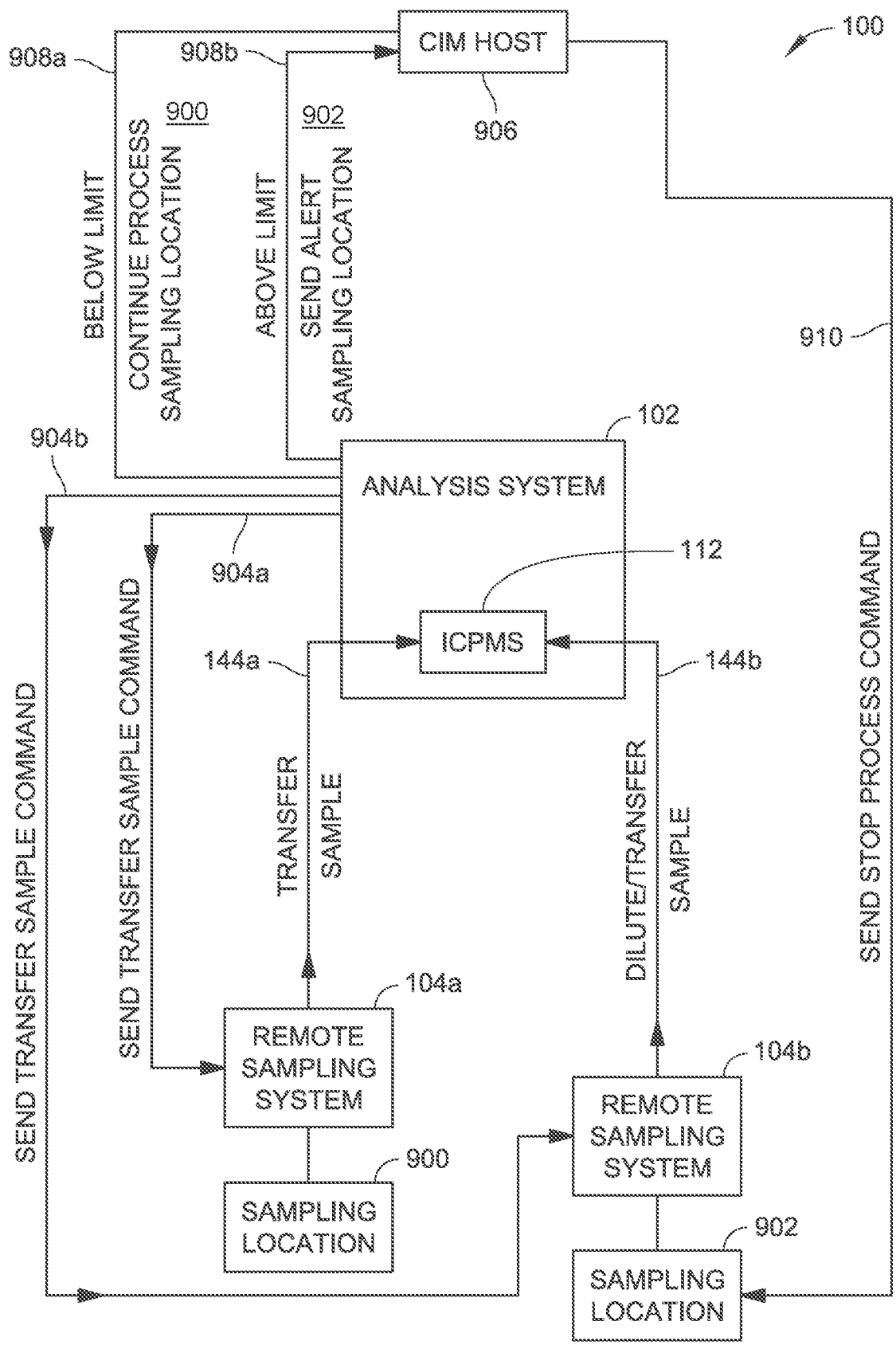
FIG. 11 is a process flow diagram of a control system for monitoring and controlling process operations based on chemical detection limits in accordance with example embodiments of the present disclosure.

Referring now to FIG. 11, an example control flow diagram for system 100 is illustrated. The analysis system 102 may be in fluid communication with two remote sample locations, shown as sample location 900 and sample location 902, via two remote sampling systems 104a and 104b and associated transfer lines 144a and 144b. In the embodiment shown, the analysis system 102 may send commands to each of the remote sampling system 104a and the remote sampling system 104b, shown as 904a and 904b, respectively. The remote sampling system 104a and the remote sampling system 104b may each transfer the sample obtained at the respective sampling location (sampling location 900 for remote sampling system 104a, sampling location 902 for remote sampling system 104b) to the analysis system 102 via transfer line 144a and transfer line 144b, respectively. The analysis system 102 may then process the samples to determine amounts of various chemical species container therein. The analysis system 102 may then determine whether any of the amounts of the chemical species exceeds an element-specific limit (e.g., a limit for a specific contaminant in the sample). In embodiments, the system 100 can set contamination limits independently for each sampling location and for particular chemical species at each sampling location independently. For example, the tolerance for a particular metal contaminant may decrease during processing, so downstream chemical samples may have lower limits for the particular chemical species than for chemical samples taken upstream.

As shown in FIG. 11, the analysis system 102 may determine that no chemical species exceeds any of the element-specific limits for the sample obtained at sampling location 900 by the remote sampling system 104a. The analysis system 102 may then send a CIM Host 906 an indication, shown as 908a, to permit continuation of process applications at the sampling location 900 due to operation of the process applications below the element-specific limits. The analysis system 102 may determine that at least one of the chemical species present in the sample obtained at sampling location 902 by the remote sampling system 104b exceeds the element-specific limit (e.g., a limit for a contaminant in the sample). The analysis system 102 may then send the CIM Host 906 an indication, shown as 908b, to send an alert directed to the process applications at the sampling location 902 due to operation of the process applications above the element-specific limits. The CIM Host 906 may then direct, via a stop process command 910, the processes at the sampling location 902 to stop operation based upon the analysis of the sample obtained by the remote sampling system 104b at the sampling location 902. In embodiments, communication between the CIM Host 906 and the components of the system 100 can be facilitated by the SECS/GEM protocol. In embodiments, the system 100 can include context-specific actions when an element is determined to be above an element-specific limit in a sample for a particular sample location, where such context-specific actions can include, but are not limited to, ignoring an alert and continuing the process operation, stopping the process operation, running a system calibration and then re-running the over-limit sample, or the like. For example, upon a first alert, the analysis system 102 can perform a calibration (or another calibration) and then re-run the sample, whereas a subsequent alert (e.g., a second alert) would cause the CIM Host 906 to command the processes at the offending sampling location to halt operations.

Figure 12:
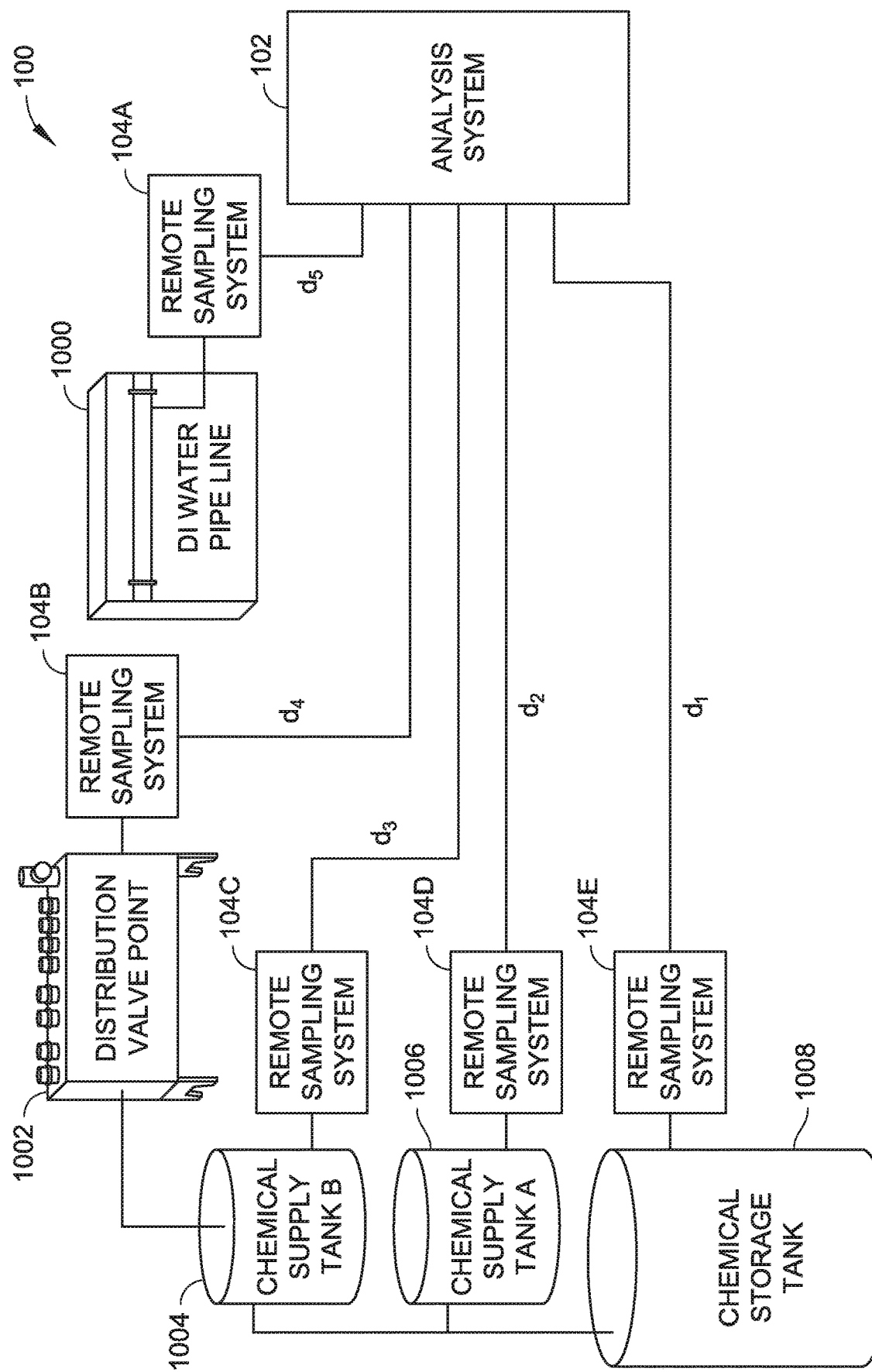
FIG. 12 is a schematic diagram of a processing facility incorporating a plurality of remote sampling systems in accordance with example embodiments of the present disclosure.

Referring now to FIG. 12, the systems 100 described in reference to FIGS. 1 through 11 can incorporate any number of remote sampling systems 104 to take samples from any number of sampling locations. In the implementation shown in FIG. 12, the system 100 can include five remote sampling systems 104 (shown as 104A, 104B, 104C, 104D, 104E) positioned at five different locations of a process facility utilizing chemical baths, bulk chemicals, environmental effluents, and other liquid samples. The remote sampling systems 104 may acquire samples at the different locations to transfer to the analysis system 102 positioned remotely from each of the five remote sampling systems 104. A first remote sampling system 104A may be positioned proximate a deionized water pipeline 1000 and spaced from the analysis system 102 by a distance (shown as $d_5$) of approximately forty meters (40 m). A second remote sampling system 104B may be positioned proximate a distribution valve point 1002 and spaced from the analysis system 102 by a distance (shown as $d_4$) of approximately eighty meters (80 m). A third remote sampling system 104C may be positioned proximate a chemical supply tank 1004 and spaced from the analysis system 102 by a distance (shown as $d_3$) of approximately eighty meters (80 m). The chemical supply tank 1004 may be positioned remotely from, and supplied with chemical from, a chemical storage tank 1008. A fourth remote sampling system 104D may be positioned proximate a chemical supply tank 1006 and spaced from the analysis system 102 by a distance (shown as $d_2$) of approximately eighty meters (80 m). The chemical supply tank 1006 may be positioned remotely from, and supplied with chemical from, the chemical storage tank 1008. A fifth remote sampling system 104E may be positioned proximate the chemical storage tank 1004 and spaced from the analysis system 102 by a distance (shown as $d_1$) of approximately three hundred meters (300 m). While five remote sampling systems 104 are shown, the system 100 can utilize more than five remote sampling systems 104 or less than five remote sampling systems 104 to monitor ultra-trace impurities throughout the processing facility, such as at other process streams, chemical baths, bulk chemical storage . . . environmental effluents, and other liquid samples. In an implementation, the transfer of sample from the remote sampling systems 104 to the analysis system is provided at a rate of approximately 1.2 meters per second (1.2 m/s), providing near real-time analysis (e.g., ICPMS analysis) of the ultra-trace impurities throughout the processing facility.

Figure 13:
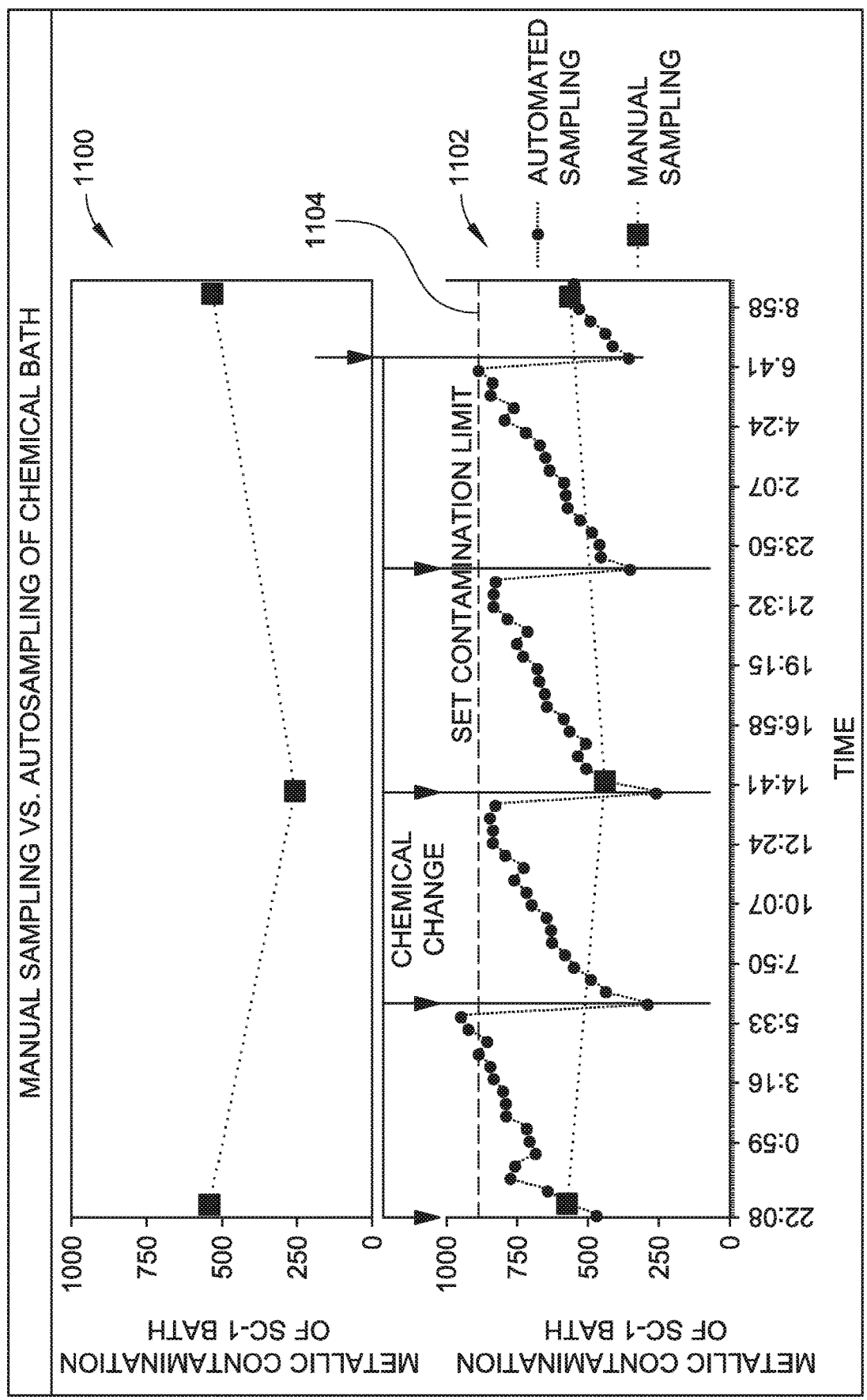
FIG. 13 is a chart illustrating metallic contamination of a chemical bath over time, with data points representing manual sampling and data points obtained with an automatic system in accordance with example embodiments of the present disclosure.

Referring now to FIG. 13, a chart showing metallic contamination of a chemical bath for semiconductor manufacturing processes (SC-1 bath) over time may be provided. The chart includes a portion 1100 showing data points for metallic contamination measured from manual samples taken at three points in time. The chart also includes a portion 1102 showing the data points for metallic contamination measured from manual samples from portion 1100 superimposed on data points for metallic contamination measured from samples taken from the system 100 (e.g., from the remote sampling systems 104) at a sampling frequency exceeding that of the manual sampling method (e.g., at least sixteen to seventeen times more frequently). As shown in portion 1102, a gradual increase in contaminants may occur over time in the semiconductor manufacturing process. Life time or life counts methods of determining when to exchange the chemicals in a particular semiconductor process (e.g., the manual sampling technique from portion 1100) may often be unable to account for the particularities of the metallic contamination over time. As such, the chemicals may often be exchanged without knowledge of the metal contaminants in the bath. This can result in over-exchanging, where the chemical bath could actually provide additional wafer processing but is changed out anyway (e.g., resulting in loss of process uptime), or in under-exchanging, where the chemical bath actually may have an unacceptable metallic contamination but is not changed out until a later time (e.g., potentially jeopardizing the wafers produced by the process). As can be seen in portion 1102, the metallic contamination can be tracked with the system 100 at a higher frequency automatically. A contamination limit 1104 is set to alert the CIM Host 906 when the contaminant limit is reached for the chemical bath. The system 100 can therefore automatically cause a stop in process operations when the contamination limit 1104 is reached (e.g., avoiding under-exchanging), while allowing the process to continue when the contamination limit 1104 is not reached, thereby providing process uptime when feasible (e.g., avoiding over-exchanging).

CONCLUSION

In implementations, a variety of analytical devices can make use of the structures, techniques, approaches, and so on described herein. Thus, although systems are described herein, a variety of analytical instruments may make use of the described techniques, approaches, structures, and so on. These devices may be configured with limited functionality (e.g., thin devices) or with robust functionality (e.g., thick devices). Thus, a device's functionality may relate to the device's software or hardware resources, e.g., processing power, memory (e.g., data storage capability), analytical ability, and so on.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system, comprising:
   a sample transfer line configured to transport a liquid sample from a sampling system via gas pressure;
   a sample loop fluidically coupled with the sample transfer line, the sample loop configured to hold a volume of liquid sample; and
   a backpressure chamber fluidically coupled with a gas pressure source and with the sample transfer line, the backpressure chamber configured to supply a backpressure against the liquid sample during transport through the sample transfer line.

2. The system of claim 1, further comprising:
   an analysis system configured to collect and analyze the liquid sample from the sample transfer line, wherein the analysis system comprises one or more of: an Inductively Coupled Plasma Mass Spectrometer (ICP/ICP-MS), an Inductively Coupled Plasma Atomic Emission Spectrometer (ICP-AES), liquid chromatograph (LC), Ion Chromatograph, Gas Chromatograph (GC), moisture analyzer, particle counter, or a Fourier transform infrared spectroscope (FTIR).

3. The system of claim 2, wherein the analysis system is located remotely from the sampling system.

4. The system of claim 2, further comprising:
   one or more detectors configured to determine that the sample loop contains a suitable liquid segment for analysis by the analysis system.

5. The system of claim 4, wherein the one or more detectors comprises:
   an optical sensor, a conductivity sensor, a pressure sensor, a metal sensor, or a conducting sensor.

6. The system of claim 4, further comprising:
   a controller operable to:
     control the gas pressure to move the liquid sample through the sample transfer line;
     maintain a constant flow rate of the liquid sample within the sample transfer line;
     communicate with the one or more detectors to detect a presence and/or an absence of the suitable liquid sample segment at one or more locations on the sample transfer line; and
     based at least in part on detecting the presence and/or absence of the suitable liquid sample segment, allow the liquid sample to be directed to the analysis system.

7. The system of claim 6, wherein the controller is further operable to:
   control the gas pressure and/or the backpressure based at least in part on a sample identity of the liquid sample.

8. A method, comprising:
   receiving a liquid sample at a sampling system;
   preparing the liquid sample for delivery and/or analysis using one or more preparation techniques; and
   transferring the liquid sample via a sample transfer line, wherein transferring the liquid sample comprises:
     providing a sample loop fluidically coupled to the sample transfer line and configured to hold a volume of liquid sample;
     using a gas pressure of a gas pressure source to push the volume of liquid sample from the sample loop; and
     supplying a backpressure against the liquid sample during transport through the sample transfer line, the backpressure generated by a backpressure chamber fluidically coupled with the gas pressure source and with the sample transfer line.

9. The method of claim 8, further comprising:
   receiving the liquid sample at an analysis system; and
   analyzing the liquid sample using the analysis system, wherein the analysis system comprises one or more of: an Inductively Coupled Plasma Mass Spectrometer (ICP/ICP-MS), an Inductively Coupled Plasma Atomic Emission Spectrometer (ICP-AES), liquid chromatograph (LC), Ion Chromatograph, Gas Chromatograph (GC), moisture analyzer, particle counter, or a Fourier transform infrared spectroscope (FTIR).

10. The method of claim 8, further comprising:
    controlling the gas pressure and/or the backpressure based at least in part on a sample identity of the liquid sample.

11. The method of claim 8, further comprising:
    controlling the gas pressure to move the liquid sample through the sample transfer line;

maintaining a constant flow rate of the liquid sample within the sample transfer line;

using one or more detectors to detect a presence and/or an absence of a suitable liquid sample segment at one or more locations on the sample transfer line; and based at least in part on detecting the presence and/or the absence of the suitable liquid sample segment, allowing the liquid sample to be directed to the analysis system.

12. The method of claim 11, wherein the one or more detectors comprises: an optical sensor, a conductivity sensor, a pressure sensor, a metal sensor, or a conducting sensor.

13. A system comprising:

a sample transfer line configured to transport a liquid sample from a sampling system via gas pressure;

a buffer fluid loop fluidically coupled with the sample transfer line, the buffer fluid loop configured to hold a buffer fluid;

a sample loop fluidically coupled with the sample transfer line and the buffer fluid loop, the sample loop configured to hold a sample fluid; and a gas pressure source configured to push the buffer fluid from the buffer fluid loop and the sample fluid from the sample loop to provide a sample fluid segment and a buffer fluid segment separately within a transfer line.

14. The system of claim 13, wherein the sample fluid segment and the buffer fluid segment are separated by a gas segment within the transfer line to separate the sample fluid segment from the buffer fluid segment.

15. The system of claim 13, further comprising a valve system, the valve system fluidically coupled with each of the sample transfer line, the buffer fluid loop, the sample loop, the gas pressure source, and the transfer line.

16. The system of claim 15, wherein the valve system is configured to switch between at least a load configuration and a transfer configuration, wherein when in the load configuration, the gas pressure source is in fluid communication with the transfer line, but not with one or more of the buffer fluid loop and the sample loop.

17. The system of claim 16, wherein when in the load configuration, the gas pressure source is in fluid communication with the transfer line, but not with the buffer fluid loop or the sample loop, and wherein when in the load configuration, the buffer fluid loop is in fluid communication with a buffer fluid source configured to supply the buffer fluid into the buffer fluid loop.

18. The system of claim 17, wherein when in the transfer configuration, the buffer fluid loop is not in fluid communication with the buffer fluid source, and wherein when in the transfer configuration, the buffer fluid loop is fluid communication with the gas pressure source.

19. The system of claim 16, wherein when in the load configuration, the sample loop is in fluid communication with the sample transfer line to supply the sample fluid into the sample loop, and wherein when in the transfer configuration, the sample loop is not in fluid communication with the sample transfer line.

20. The system of claim 19, wherein when in the transfer configuration, the sample loop is fluid communication with the gas pressure source.

* * * * *